United States Patent
Akiyama

(10) Patent No.: US 9,667,344 B2
(45) Date of Patent: May 30, 2017

(54) OPTICAL TRANSMISSION APPARATUS AND DETECTION APPARATUS

(71) Applicant: FUJITSU LIMITED, Kawasaki-shi, Kanagawa (JP)

(72) Inventor: Yuichi Akiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 54 days.

(21) Appl. No.: 14/794,873

(22) Filed: Jul. 9, 2015

(65) Prior Publication Data

US 2016/0020853 A1    Jan. 21, 2016

(30) Foreign Application Priority Data

Jul. 16, 2014  (JP) ................. 2014-146074

(51) Int. Cl.
| | | |
|---|---|---|
| *H04B 10/035* | (2013.01) | |
| *H04B 10/079* | (2013.01) | |
| *H04B 10/50* | (2013.01) | |
| *H04B 10/58* | (2013.01) | |
| *H04B 10/564* | (2013.01) | |

(52) U.S. Cl.
CPC ... *H04B 10/07955* (2013.01); *H04B 10/5057* (2013.01); *H04B 10/564* (2013.01); *H04B 10/58* (2013.01)

(58) Field of Classification Search
CPC ............ H04B 10/505; H04B 10/50577; H04B 10/5057; H04B 10/506; H04B 10/572; G02F 1/0121; G02F 2001/212; G02F 1/225
USPC .......................................................... 398/38
See application file for complete search history.

(56) References Cited

U.S. PATENT DOCUMENTS

| | | | |
|---|---|---|---|
| 2002/0191261 A1* | 12/2002 | Notargiacomo | H04B 10/505 398/183 |
| 2006/0045450 A1* | 3/2006 | Bickham | G02B 6/02014 385/127 |
| 2007/0133918 A1 | 6/2007 | Cho et al. | |
| 2007/0177882 A1 | 8/2007 | Akiyama | |
| 2008/0080872 A1 | 4/2008 | Tanaka et al. | |
| 2008/0166119 A1* | 7/2008 | Ryu | H04B 10/0793 398/17 |
| 2010/0098435 A1 | 4/2010 | Akiyama | |

(Continued)

FOREIGN PATENT DOCUMENTS

| | | |
|---|---|---|
| EP | 1906564 | 4/2008 |
| EP | 2169851 | 3/2010 |

(Continued)

OTHER PUBLICATIONS

EESR—The Extended European Search Report mailed on Mar. 18, 2016 for corresponding European Patent Application No. 15176429.7.

(Continued)

*Primary Examiner* — Don N Vo
(74) *Attorney, Agent, or Firm* — Fujitsu Patent Center

(57) ABSTRACT

An optical transmission apparatus includes an optical modulator that is driven by a drive signal generated from an electrical signal obtained by performing a digital signal processing on a data signal, a detector configured to detect a change in a spectrum of output light of the optical modulator, and a controller configured to control the digital signal processing based on a detection result of the detector.

19 Claims, 18 Drawing Sheets

(56) References Cited

U.S. PATENT DOCUMENTS

| | | |
|---|---|---|
| 2011/0170877 A1 | 7/2011 | Akiyama |
| 2012/0194287 A1* | 8/2012 | McGhan ............. H04L 27/2028 332/103 |
| 2013/0183046 A1* | 7/2013 | Blanchette .......... H01S 3/06758 398/186 |

FOREIGN PATENT DOCUMENTS

| | | |
|---|---|---|
| EP | 2634934 | 9/2013 |
| JP | 2007-208472 | 8/2007 |
| JP | 2008-92172 | 4/2008 |

OTHER PUBLICATIONS

EESR—Partial European Search Report mailed on Nov. 30, 2015 for corresponding European Patent Application No. 15176429.7.

\* cited by examiner

ELECTRICAL
MODULATED SIGNAL

OPTICAL SPECTRUM

FREQUENCY RESPONSE CHANGE
VS
OPTICAL POWER CHANGE

ELECTRICAL
MODULATED SIGNAL

OPTICAL SPECTRUM

FREQUENCY RESPONSE CHANGE
VS
OPTICAL POWER CHANGE

ELECTRICAL
MODULATED SIGNAL

OPTICAL SPECTRUM

FREQUENCY RESPONSE CHANGE
VS
OPTICAL POWER CHANGE

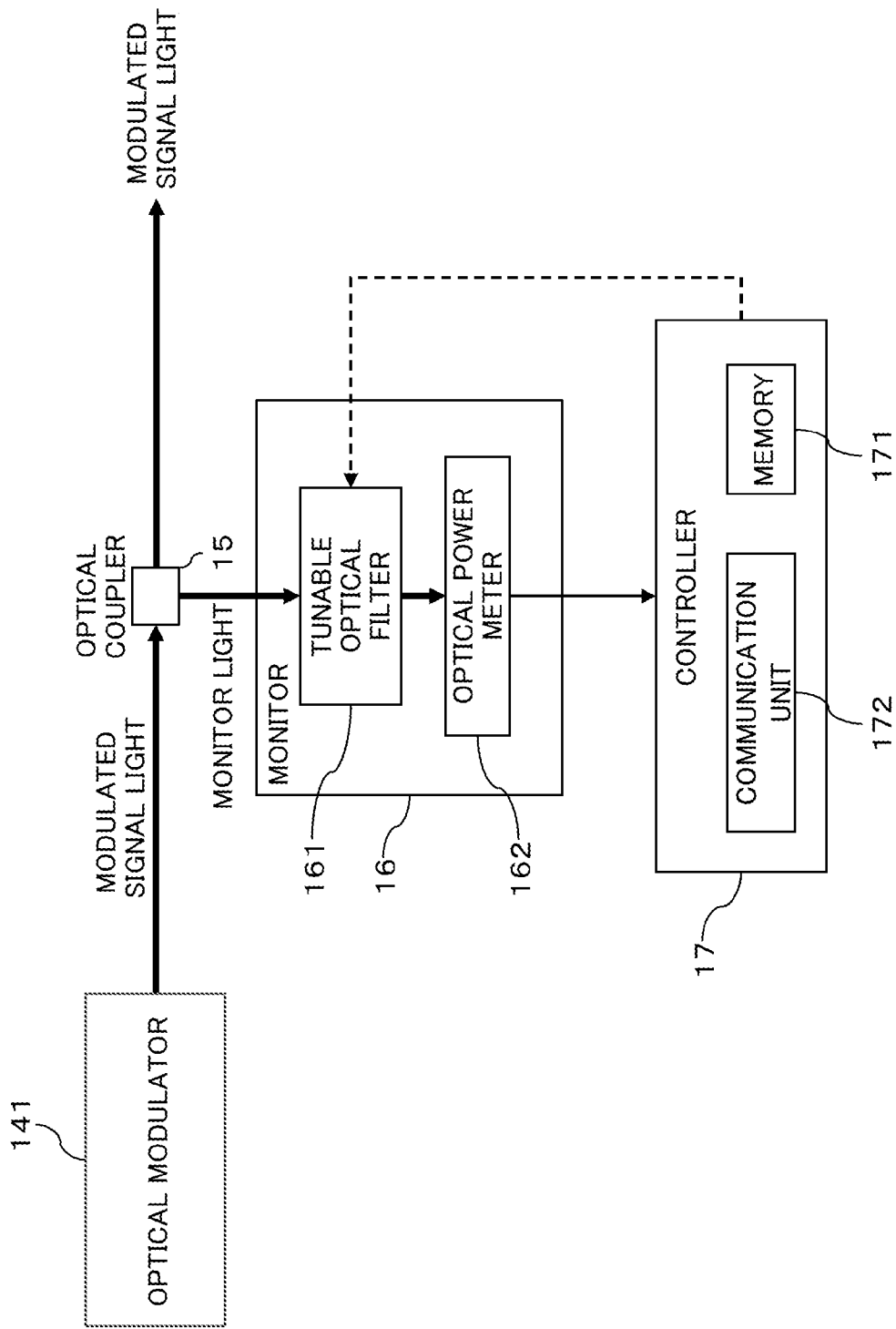

OPTICAL TRANSMISSION APPARATUS AND DETECTION APPARATUS

CROSS-REFERENCE TO RELATED APPLICATION

This application is based upon and claims the benefit of priority of the prior Japanese Patent Application No. 2014-146074, filed on Jul. 16, 2014, the entire contents of which are incorporated herein by reference.

FIELD

An embodiment discussed herein relates to an optical transmission apparatus and a detection apparatus.

BACKGROUND

JP 2007-208472 A and JP 2008-92172 A disclose techniques related to an optical communication system and an optical transmitter. According to the techniques, an optical modulator and a driver (e.g. an electrical amplifier) which applies a drive signal to the optical modulator are operated in a saturated region as much as possible to obtain stable transmission light. For example, a drive signal having an amplitude corresponding to a double (2×Vπ) half-wavelength voltage Vπ is applied to an optical modulator for an optical QPSK (Quadrature Phase Shift Keying) scheme.

Meanwhile, in order to expand a transmission distance and transmission capacity in an optical communication system, it has been studied that a digital signal processing is applied to an optical transmitter in the optical communication system. For example, it is possible to generate signals with various formats such as a dispersion pre-equalization signal, a Nyquist signal and a quadrature amplitude modulation (QAM) signal are generated by using the digital signal processing. By applying any one of these signals as a drive signal to an optical modulator, it is possible to generate transmission light with the format according to the digital signal processing.

For example, by using the dispersion pre-equalization signal, it is possible to compensate for wavelength dispersion which occurs in transmission light propagating in an optical transmission line to expand a transmission distance of the transmission light. By using a Nyquist signal which is subjected to a band limitation with a Nyquist filter in the digital signal processing, it is possible to improve frequency usage efficiency according to the band limitation. By using a QAM signal, it is possible to transmit a greater amount of information than that of, for example, a phase-shift keying (PSK) signal to expand transmission capacity.

Thus, in a case where signal lights with various modulation formats are available by applying the digital signal processing to the optical transmitter, the optical modulator may be driven by a drive signal with an amplitude smaller than 2×Vπ. In other words, the optical modulator and the driver may be operated in a linear region.

In such a case, when characteristics of a drive signal are changed, characteristics of modulated signal light output from the optical modulator are also changed. Such change may cause a deterioration in quality of the modulated signal light. The above-mentioned techniques fail to study the possibility of the deterioration in quality of modulated signal light due to the change in characteristics of a drive signal.

SUMMARY

According to one aspect, an optical transmission apparatus may include an optical modulator, a detector, and a controller. The optical modulator is driven by a drive signal which is generated from an electrical signal. The electrical signal is obtained by performing a digital signal processing on a data signal. The detector is configured to detect a change in a spectrum of output light of the optical modulator. The controller is configured to control the digital signal processing based on a detection result of the detector.

Further, according to one aspect, an optical transmission apparatus may include an optical modulator, a detector, and a controller. The optical modulator is driven by a drive signal which is generated from an electrical signal. The electrical signal is obtained by performing a digital signal processing on a data signal. The detector is configured to detect a change in a spectrum of output light of the optical modulator. The controller is configured to notify an external apparatus of information indicative of an occurrence of a band change in the output light of the optical modulator in response to a detection that the change in the spectrum detected by the detector exceeds a predetermined change amount.

Furthermore, according to one aspect, a detection apparatus may include a drive signal generator and a detector. The drive signal generator is configured to generate a drive signal for an optical modulator from an electrical signal. The electrical signal is obtained by performing a digital signal processing on a data signal. The detector is configured to detect a change in a difference between optical power of a first band and optical power of a second band. The first band corresponds to a partial band of the spectrum including a center frequency of the spectrum of the output light of the optical modulator. The second band corresponds to a partial band of the spectrum different from the first band.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a block diagram illustrating an exemplary configuration of the optical transmitter with focusing on the monitor illustrated in FIG. 1;

DESCRIPTION OF EMBODIMENTS

Figure 1:
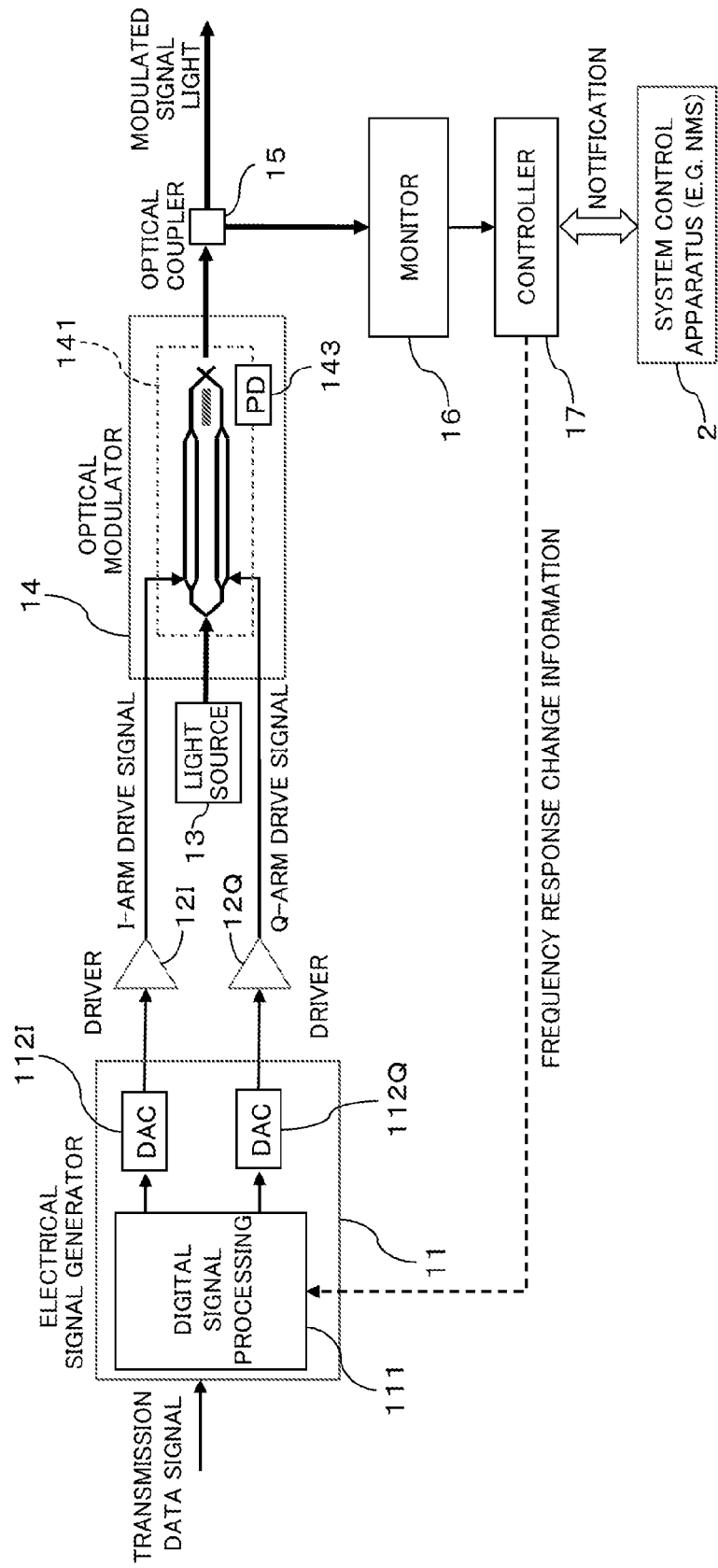
FIG. 1 is a block diagram illustrating an exemplary configuration of an optical transmitter according to one embodiment.

An embodiment will be described below with reference to the drawings. The embodiment described below is, however, merely an exemplary embodiment, and does not intend to exclude various modifications and application of a technique which are not explicitly described below. In addition, portions assigned the same reference numerals in the drawings used in the following embodiment indicate the identical or similar portions unless otherwise stated.

FIG. 1 is a block diagram illustrating an exemplary configuration of an optical transmitter (may be also referred to as an "optical transmission apparatus") according to one embodiment. The optical transmitter 1 illustrated in FIG. 1 includes, for example, an electrical signal generator 11, drivers 12I and 12Q, a light source 13, an optical modulator 14 which includes an optical modulator 141, an optical coupler 15, a monitor 16, and a controller 17.

In FIG. 1, a reference numeral "2" denotes a system control apparatus 2 that controls an entire optical transmission system including the optical transmitter 1. A nonrestrictive example of the system control apparatus 2 may be an NMS (Network Management System) or the like.

The electrical signal generator 11 performs a digital signal processing on a transmission data signal, and generates an electrical signal (e.g. voltage signal) which is a drive signal for the optical modulator 14. Hence, the electrical signal generator (may also be referred to as a "drive signal generator") 11 illustratively includes a digital signal processor (DSP) 111, and digital-analog converters (DAC) 112I and 112Q.

The DSP 111 is an example of a processor having arithmetic operation capability. The DSP 111 performs a digital signal processing on a transmission data signal according to a modulation format to generate a transmission digital signal. An example of the modulation format is a Nyquist QPSK (Quadrature Phase Shift Keying). Modulated signal light obtained by the Nyquist QPSK may correspond to signal light obtained by performing a band limitation with a Nyquist filter of a digital signal processing on a transmission data signal.

The Nyquist QPSK is an example of a modulation format which drives the optical modulator 141 with a drive signal having an amplitude smaller than an amplitude corresponding to double ($2 \times V\pi$) half-wavelength voltage $V\pi$. Driving the optical modulator 141 with the drive signal having the amplitude smaller than $2 \times V\pi$ may be considered as corresponding to operating the optical modulator 141 in a non-saturated region (e.g. linear region) rather than in a saturated region.

Modulation formats of operating the optical modulator 141 in the linear region are not limited to the Nyquist QPSK. Examples of the other modulation formats may include M-level quadrature amplitude modulation format such as $2^M$-QAM (Quadrature Amplitude Modulation). M is an integer equal to or more than 2 and represents a multi-level. As the multi-level is larger, it is possible to transmit a greater amount of information per single modulation.

A differential modulation format or a polarization-multiplexing scheme may be combined with the QPSK or the QAM to further increase the available amount of transmission information per single modulation. The differential modulation format is an example of a modulation format of allocating different information bits to a plurality of differential signals shifted in phases. The QPSK and the QAM using the differential signals may be referred to as a DPSK (Differential PSK) and a DQAM (Differential QAM), respectively.

In contrast, the polarization-multiplexing scheme is an example of allocating different information bits to different polarizations (e.g. an X-polarization and a Y-polarization) of light to multiplex the information bits. The QPSK and the QAM using the polarization-multiplexing scheme may be referred to as a DP (Dual Polarization)-QPSK and a DP-QAM, respectively.

Each of the DACs 112I and 112Q in the electrical signal generator 11 convert a transmission digital signal generated by the DSP 111 into an analog signal. One of the DACs 112I and 112Q (for example, DAC 112I) converts a signal corresponding to in-phase components (or I components), when a transmission digital signal is allocated (or mapped) to symbols represented by a complex plane (or IQ plane), into an analog signal. The other DAC 112Q converts a signal corresponding to quadrature phase components (or Q components), when the transmission digital signal is mapped to symbols represented by the IQ plane, into an analog signal.

Both of the drivers 12I and 12Q may be, for example, electrical amplifiers and provided for the individual I components and the Q components. The drivers 12I and 12Q amplify the analog electrical signals input from the corresponding DACs 112I and 112Q such that the analog signals have appropriate amplitudes for drive signals applied to the optical modulator 141.

For example, one driver 12I generates a drive signal having the amplitude corresponding to the analog electrical signal of the I components input from the DAC 112I to apply the generated drive signal to a drive electrode provided for an optical waveguide which forms an I-arm of the optical modulator 141.

The other driver 12Q generates a drive signal having the amplitude corresponding to the analog electrical signal of the Q components input from the DAC 112Q and corresponding to apply the generated drive signal to a drive electrode provided for an optical waveguide which forms a Q-arm of the optical modulator 141.

The light source 13 may be, for example, a semiconductor laser diode (LD) which emits light with a wavelength. The light source 13 may be a tunable LD which is variable in light emission wavelength. Output light of the light source 13 is input to the optical modulator 141.

The optical modulator 141 may be illustratively an LN modulator with a lithium niobate (LiNbO3), and may include the optical waveguide which forms the I-arm and the optical waveguide which forms the Q-arm. Further, the optical modulator 141 may include an optical branch which branches light from the light source 13 to the I-arm and the Q-arm, and an optical interferer at which light propagating through the I-arm and the Q-arm joins and interferes.

The I-arm and the Q-arm are respectively provided with the drive electrodes as described above, and the drive signals are applied to the drive electrodes from the corresponding drivers 12I and 12Q. The refractive index of the I-arm and Q-arm are changed in response to changes in the applied drive signals. Thus, the phases of light propagating through the I-arm and Q-arm are changed in response to the change of refractive index. In response to the change in the phase of the lights, the intensity of light output from the optical interferer changes. In this way, the optical modulator 141 modulates transmission light input from the light source 13 by the drive signals according to the transmission data signals to generate modulated signal light.

A photo detector (PD) 143 may be provided inside or outside the optical modulator 141. The PD 143 may receive any one or more of: input light input to the optical modulator 141; light propagating in one or both of the I-arm and the Q-arm; and output light of the optical modulator 141 as appropriate. The PD 143 generates an electrical signal corresponding to an optical power of the received light. The electrical signal may be used to, for example, control (e.g., feedback-control) a drive signal of the optical modulator 141.

The optical coupler 15 branches (may also be referred to as "tap") the modulated signal light output from the optical modulator 141. One of branched lights is output as transmission light to an optical transmission line, and the other of the branched lights is output as monitor light to the monitor 16.

The monitor 16 monitors (may also be referred to as "detect") characteristics of the drive signal of the optical modulator 141 based on the monitor light input from the optical coupler 15. The characteristics of monitoring target are, for example, frequency response of the drive signal. The monitor 16 may also be referred to as a "measurer 16".

When the frequency response of the drive signals which drive the optical modulator 141 are changed, a waveform (or spectrum) of the modulated signal light output from the optical modulator 141 are also changed in response to the change in the frequency response. Hence, the waveform of the modulated signal light may be shifted from a waveform (may also be referred to as an "ideal waveform") which is expected as a result of the application of the digital signal processing. The "waveform shift" causes a deterioration in quality of the transmission signal light transmitted by the optical transmitter 1.

Therefore, in the present embodiment, the monitor 16 monitors the output light of the optical modulator 141 to enable, for example, the controller 17 to detect a change in the frequency response of the drive signal. The detailed method of detecting the change in the frequency response will be described later. The monitor 16 and the controller 17 may be considered as an example of a "detection apparatus" or a "detector" which detects a change in the spectrum of the output light of the optical modulator 141.

The controller 17 monitors quality (for example, a change in a band described later) of the modulated signal light (in other words, transmission signal light) based on a monitoring result of the monitor 16. When determining that the quality goes below a predetermined quality, the controller 17 may notify information indicative of a deterioration in transmission signal quality to the system control apparatus 2 available to control the entire optical transmission system in which the optical transmitter 1 is used.

In response to a reception of the notification indicative of the deterioration in the quality, the system control apparatus 2 is available to perform control or adjustment to compensate for the deterioration in the signal quality for the entire optical transmission system. Accordingly, it is possible to improve the transmission quality of the entire optical transmission system.

In FIG. 1, the electrical signal generator 11, the drivers 12I and 12Q, the optical modulator 14 and the monitor 16 are illustrated in separate blocks. However, these blocks may be integrated 1 or a part of the blocks may be integrated in the optical transmitter. Further, in FIG. 1, there is one drive signal for each of the I-arm and the Q-arm. However, the drive signals may be two or more differential signals for each of the I-arm and the Q-arm.

(First Exemplary Method of Detecting Change in Band Characteristics)

Next, an example of a method of detecting a change in the band characteristics of a drive signal will be described with reference to FIGS. 2 to 10.

Figure 2:
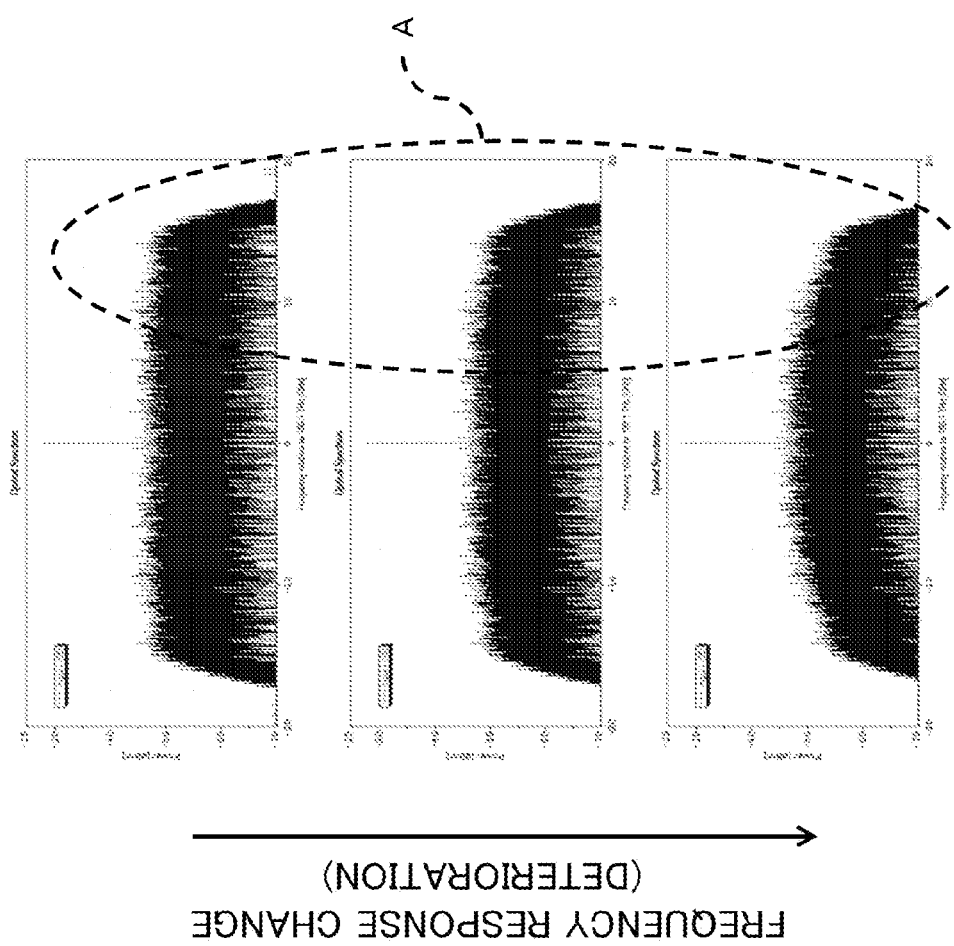
FIG. 2 is a diagram illustrating an exemplary spectrum of modulated signal light obtained by applying a Nyquist QPSK electrical modulated signal as a drive signal to an optical modulator illustrated in FIG. 1.

FIG. 2 is a diagram illustrating examples of spectra of modulated signal light when an electrical signal (may also be referred to as an "electrical modulated signal") obtained by modulating a transmission data signal with the Nyquist QPSK in the electrical signal generator 11 (DSP 111) is applied as a drive signal to the optical modulator 141. In FIG. 2, the horizontal axis represents a frequency and the vertical axis represents an optical power.

The spectrum at the top of the three spectra illustrated in FIG. 2 is the most close to ideal spectrum (e.g. rectangular shape) of the Nyquist QPSK modulated signal light.

In contrast, the spectrum illustrated at the middle in FIG. 2 has a relatively unsharp waveform compared with the that of the spectrum at the top stage, and the spectrum illustrated at the bottom in FIG. 2 has a further unsharp waveform compared with that of the spectrum at the middle.

In other words, FIG. 2 illustrates that the spectrum of the Nyquist QPSK deteriorates from the ideal spectrum in order from the top to the bottom. Focusing upon, for example, a portion (or a band) encircled by a dotted frame A in FIG. 2, optical power tends to lower near an end portion of the spectrum of the modulated signal light.

Such a change (or deterioration) in the spectrum may be referred to as "a band change (or band deterioration)". The band change may be caused by a change in characteristics of the drive signals given to the optical modulator 141 from the electrical signal generator 11 through the drivers 12I and 12Q (in other words, electrical paths from the electrical signal generator 11 to the optical modulator 141) illustrated in FIG. 1. Therefore, it is possible to detect the change in the characteristics of the drive signal by detecting the band change.

Figure 3:
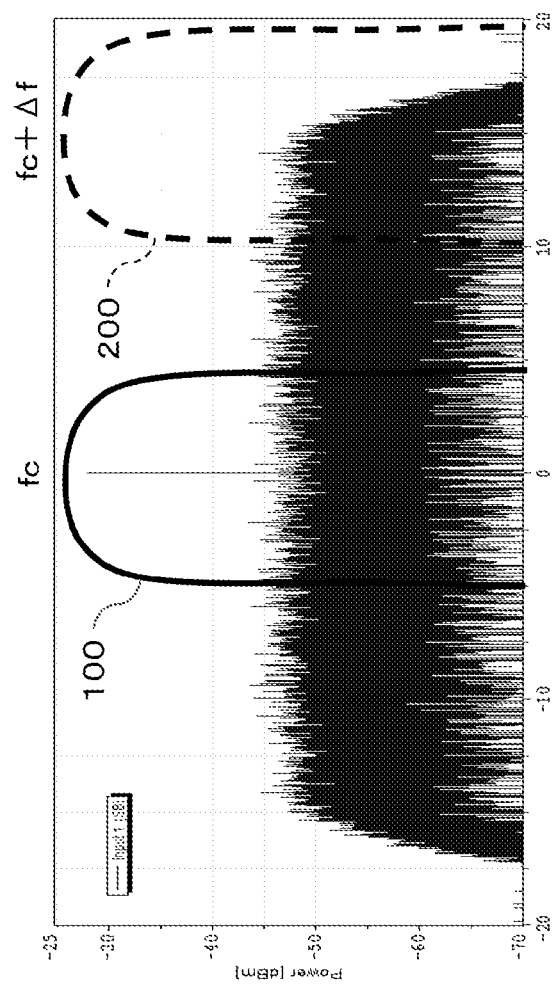
FIG. 3 is a diagram illustrating an exemplary spectrum of Nyquist QPSK modulated signal light to explain an example of a monitor band of the spectrum.

Here, it is possible to detect the band change by, for example, detecting a change in optical power corresponding to the frequency (or a band) whose change appears relatively large in the spectrum of the modulated signal light. A non-restrictive example detects, as illustrated in FIG. 3, optical power (Pfc) of a first band including a center frequency (fc) of the modulated signal light and optical power (PfΔ) of a second band including a frequency (fc+fΔ) shifted from the center frequency fc by fΔ in a positive frequency as the center frequency of the second band.

A separation frequency fΔ shifted from the center frequency fc may be set to a half of a baud rate B (i.e., B/2) or substantially set to the B/2. Further, bandwidths of the first band and the second band are not limited in particular, yet may be set to the B/2 or substantially set to the B/2.

In other words, the first band may be a partial band of the spectrum of the modulated signal light, and may have the bandwidth of B/2 whose center frequency is the center frequency fc of the modulated signal light. Meanwhile, the second band may be a partial band of the spectrum of the modulated signal light different from the first band, and may have the bandwidth of B/2 whose center frequency is the frequency fc+fΔ shifted from the center frequency fc of the modulated signal light by fΔ. In an example in FIG. 3, the second band corresponds to a band near the end (e.g., the right end in FIG. 3) of the spectrum.

Light in the first band and the second band can be detected (or filtered) by, for example, using an optical filter. In FIG. 3, characteristics indicated by a solid line 100 indicate first filter characteristics which allow the light in the first band to pass (or transmit), and characteristics indicated by a dotted line 200 indicate second filter characteristics which allow the light in the second band to pass (or transmit).

For example, the filter center frequency of the first filter characteristics 100 corresponds to the center frequency fc of the modulated signal light, and the filter bandwidth of the first filter characteristics 100 is B/2. Meanwhile, the filter center frequency of the second filter characteristics 200 corresponds to the frequency fc+fΔ shifted from the center frequency fc of the modulated signal light by fΔ, and the filter bandwidth of the second filter characteristics 200 is B/2.

The first filter characteristics 100 and the second filter characteristics 200 may be realized as characteristics of individual optical filters, or may be realized by changing a transmission center frequency of one optical filter with a variable filter center frequency.

Figure 4:
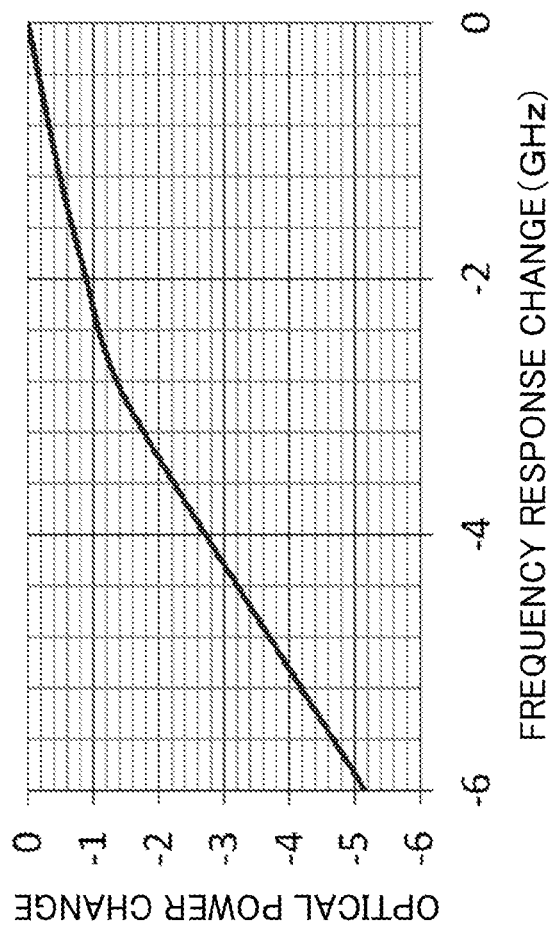
FIG. 4 is a diagram illustrating an example of a relationship between a change in optical power measured by using a monitor illustrated in FIG. 1 and a change in a band of the drive signal applied to the optical modulator.

By using the optical filter having the filter characteristics described above, it is possible to detect a difference P (=Pfc−PfΔ) between the optical power Pfc of the first band and the optical power PfΔ of the second band. A change corresponding to the band change appears in the difference P (hereinafter, may also be referred to as an "optical power difference P") as illustrated in FIG. 4, for example. For example, the change in the optical power difference P tends to increase as the band change increases. The "change in the optical power difference P" may also be referred to simply as an "optical power change".

Consequently, by detecting the optical power difference P, it is possible to detect the band change based on the relationship illustrated in FIG. 4. By setting filtering (in other words, monitoring) target bands to two different bands of the first band and the second band as illustrated in FIG. 3, it is possible to achieve an effect or advantage set out below.

For example, output optical power of the optical modulator 141 may fluctuate due to a factor such as a fluctuation in the output optical power of the light source 13, which is different from the change in characteristics of a drive signal. Hence, when a monitoring target band (hereinafter, may also be referred to as a "monitor band") is set to a single band, it may be unavailable to exclude (or distinguish) an influence of the above-described different factor.

In contrast, by setting monitor bands to two different bands and detecting the optical power difference P between the monitor bands as described above, it is possible to cancel (or minimize) the fluctuation in power due to the different factor. For example, when output optical power of the light source 13 fluctuates, this fluctuation in the power appears in the whole spectrum (in other words, in each frequency component of the spectrum) of the modulated signal light illustrated in FIGS. 2 and 3.

Therefore, by calculating the difference between optical power of the two monitor bands, it is possible to cancel the change in the power corresponding to the fluctuation of the output optical power of the light source 13. Consequently, the band change caused by the change in characteristics of the drive signal becomes dominant as a change appearing in the optical power difference P.

In this way, by detecting the change in the spectrum of the modulated signal light as the change in the optical power difference P between the different bands, it is possible to improve detection accuracy of the band change (or band deterioration) in the modulated signal light. In this regard, when a fluctuation in power of modulated signal light due to the different factor such as a fluctuation in output optical power of the light source 13 is negligibly small, a monitor band may be set to a single band.

When the electrical signal generator 11 generates a normal QPSK electrical modulated signal which is a non-Nyquist QPSK electrical modulated signal, a change does not appear in the detected optical power difference P as illustrated in FIG. 4 or is not available to be observed with sufficient sensitivity even if the change appears. Driving the optical modulator 141 with a drive signal of a normal QPSK electrical modulated signal corresponds to driving the optical modulator 141 with a drive signal having the amplitude of 2×Vπ to operate the optical modulator 141 in the saturated region.

Figure 5A:
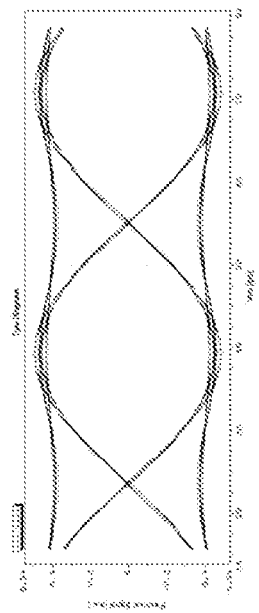
FIG. 5A is a diagram illustrating an exemplary waveform of a normal QPSK electrical modulated signal which is a non-Nyquist QPSK electrical modulated signal.
Figure 5B:
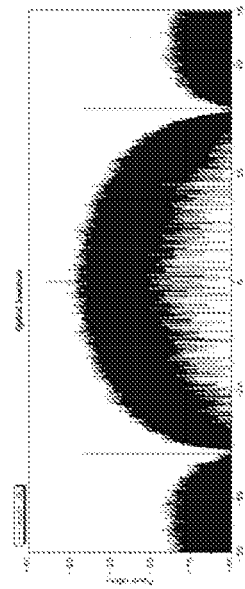
FIG. 5B is a diagram illustrating an exemplary spectrum of modulated signal light obtained by applying the electrical modulated signal illustrated in FIG. 5A to the optical modulator.

FIG. 5A illustrates an exemplary waveform of the normal QPSK electrical modulated signal, and FIG. 5B illustrates an exemplary spectrum of the modulated signal light when the QPSK electrical modulated signal illustrated in FIG. 5A is applied as a drive signal to the optical modulator 141.

Figure 5C:
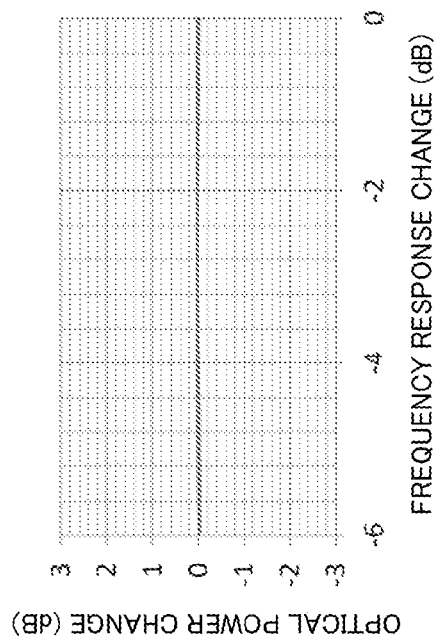
FIG. 5C is a diagram illustrating an example of a relationship between a change in optical power of normal QPSK modulated signal light and a change in a band of the drive signal applied to the optical modulator.

Further, FIG. 5C illustrates an example of a change in the optical power difference P in response to the band change when the QPSK electrical modulated signal illustrated in FIG. 5A is applied as a drive signal to the optical modulator 141. As illustrated in FIG. 5C, when the optical modulator 141 is operated in the saturated region, the change in the optical power difference P due to the band change does not occur or is not available to be detected with sufficient sensitivity even if the change occurs.

Figure 6A:
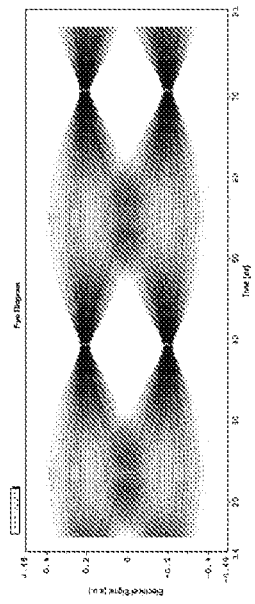
FIG. 6A is a diagram illustrating an exemplary waveform of a Nyquist QPSK electrical modulated signal.
Figure 6B:
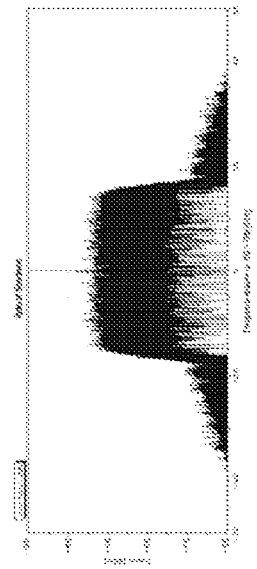
FIG. 6B is a diagram illustrating an exemplary spectrum of modulated signal light obtained by applying an electrical modulated signal illustrated in FIG. 6A to the optical modulator.
Figure 6C:
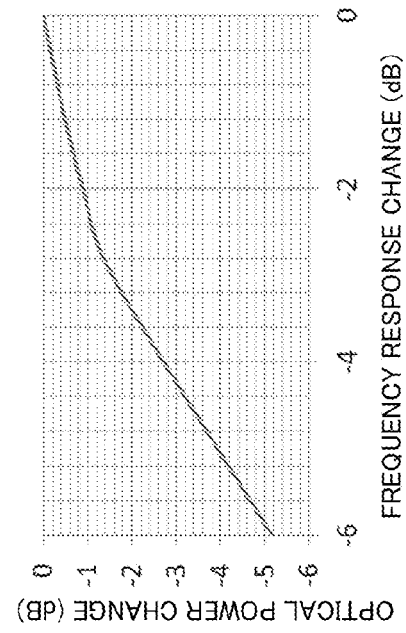
FIG. 6C is a diagram illustrating an example of a relationship in the Nyquist QPSK between a change in optical power of the modulated signal light and a change in a band of the drive signal applied to the optical modulator.

In contrast, when the optical modulator 141 is operated in a linear region by using the Nyquist QPSK electrical modulated signal having a waveform illustrated in FIG. 6A as the drive signal applied to the optical modulator 141, a change in the optical power difference P occurs in response to the band change as illustrated in FIG. 6C. FIG. 6B is a diagram illustrating an exemplary spectrum of the modulated signal light when the Nyquist QPSK electrical modulated signal illustrated in FIG. 6A is applied as a drive signal to the optical modulator 141. FIG. 6C is a diagram corresponding to FIG. 4.

A modulation format which may cause a change in the optical power difference P in response to the band change is not limited to the Nyquist QPSK. For example, when a 16 QAM electrical modulated signal is applied as a drive signal to the optical modulator 141, the optical modulator 141 also operates in the linear region. Therefore, it is possible to detect the band change by detecting the optical power difference P.

Figure 7A:
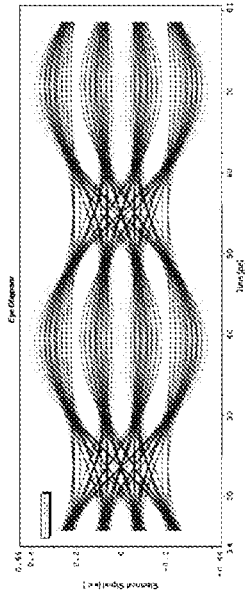
FIG. 7A is a diagram illustrating an exemplary waveform of a 16 QAM electrical modulated signal.
Figure 7B:
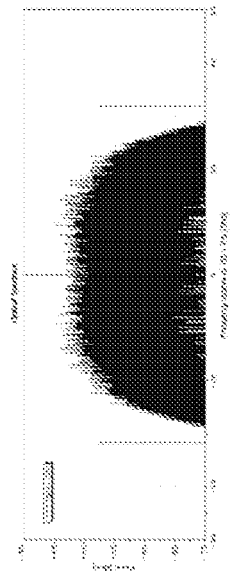
FIG. 7B is a diagram illustrating an exemplary spectrum of modulated signal light obtained by applying an electrical modulated signal illustrated in FIG. 7A to the optical modulator.

FIG. 7A illustrates an exemplary waveform of the 16 QAM electrical modulated signal, and FIG. 7B illustrates an exemplary spectrum of modulated signal light when the 16 QAM electrical modulated signal illustrated in FIG. 7A is applied as a drive signal to the optical modulator 141.

Figure 7C:
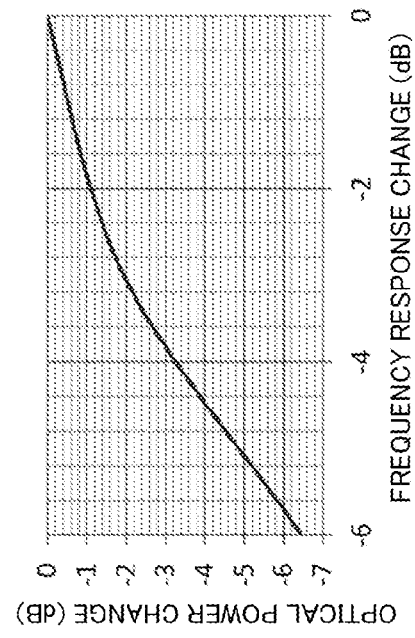
FIG. 7C is a diagram illustrating an example of a relationship in the 16 QAM between a change in optical power of the modulated signal light and a change in a band of the drive signal applied to the optical modulator.

Further, FIG. 7C illustrates an example of a change in the optical power difference P in response to the band change when the 16 QAM electrical modulated signal illustrated in FIG. 7A is applied as the drive signal to the optical modulator 141. As illustrated in FIG. 7C, even when the 16 QAM electrical modulated signal is applied as the drive signal to the optical modulator 141, it is possible to detect the band change by detecting the optical power difference P.

(Exemplary Configuration of Monitor 16)

Next, an exemplary configuration of the monitor 16 (see FIG. 1) which realizes the above-described method of detecting the band change will be described.

FIG. 8 is a block diagram illustrating an exemplary configuration of the monitor 16 illustrated in FIG. 1. The monitor 16 illustrated in FIG. 8 illustratively includes a tunable optical filter 161 and an optical power meter 162.

The tunable optical filter 161 is illustratively an optical filter whose transmission center wavelength (frequency) is variable. The first and second filter characteristics 100 and 200 illustrated in FIG. 3 are realize by controlling the transmission center wavelength of the optical filter 161. For example, the setting or changing of the transmission center wavelength may be controlled by the controller 17 illustrated in FIG. 1.

The optical power meter 162 detects (or measures) power of light passed through the tunable optical filter 161 when the tunable optical filter 161 is set to have the first and second filter characteristics 100 and 200.

Thereby, as illustrated in FIG. 3, the optical power meter 162 measures the optical power Pfc of the first band including the center frequency fc of the modulated signal light, and the optical power PfΔ of the second band including the center frequency of the frequency (fc+fΔ) shifted from the center frequency fc by fΔ in the positive frequency. The measurement results are output to the controller 17.

The controller 17 calculates the optical power difference P as described above based on the measurement results of the optical power meter 162. In order to detect the change in the optical power difference P, the controller 17 may store the measurement results of the optical power meter 162 at different measurement timings into a memory 171 illustrated in FIG. 8, for example.

One of the different measurement timings (corresponds to a first measurement timing) may be a timing at which the optical transmitter 1 is activated, and another timing (corresponds to a second measurement timing) may be a timing after the optical transmitter 1 is activated (e.g. an arbitrary timing during an operation).

The controller 17 detects the change in the optical power difference P based on the optical power difference P obtained from the measurement results at the different measurement timings and compares the detected change with a threshold value. The threshold value may be set to a value corresponding to a predetermined change amount (or deterioration amount) of the detected change in the relationship illustrated in FIG. 4. As a non-restrictive example, the threshold value may be set to the change amount of the optical power difference P corresponding to "−3 GHz" of the band change (or band deterioration). The threshold value may be stored in the memory 171.

When the change in the optical power difference P exceeds the threshold value, the controller 17 may notify the system control apparatus 2 such as the NMS of an occurrence of deterioration in quality of the modulated signal light transmitted by the optical transmitter 1. The notification may be performed by, for example, a communication unit 172 illustrated in FIG. 8.

The monitor 16 illustrated in FIG. 8 measures the optical power Pfc and the optical power PfΔ of the different monitor bands by controlling the transmission center frequency of the single tunable optical filter 161 with the optical power meter 162. However, individual optical filters may be provided for the individual monitor bands.

Figure 9:
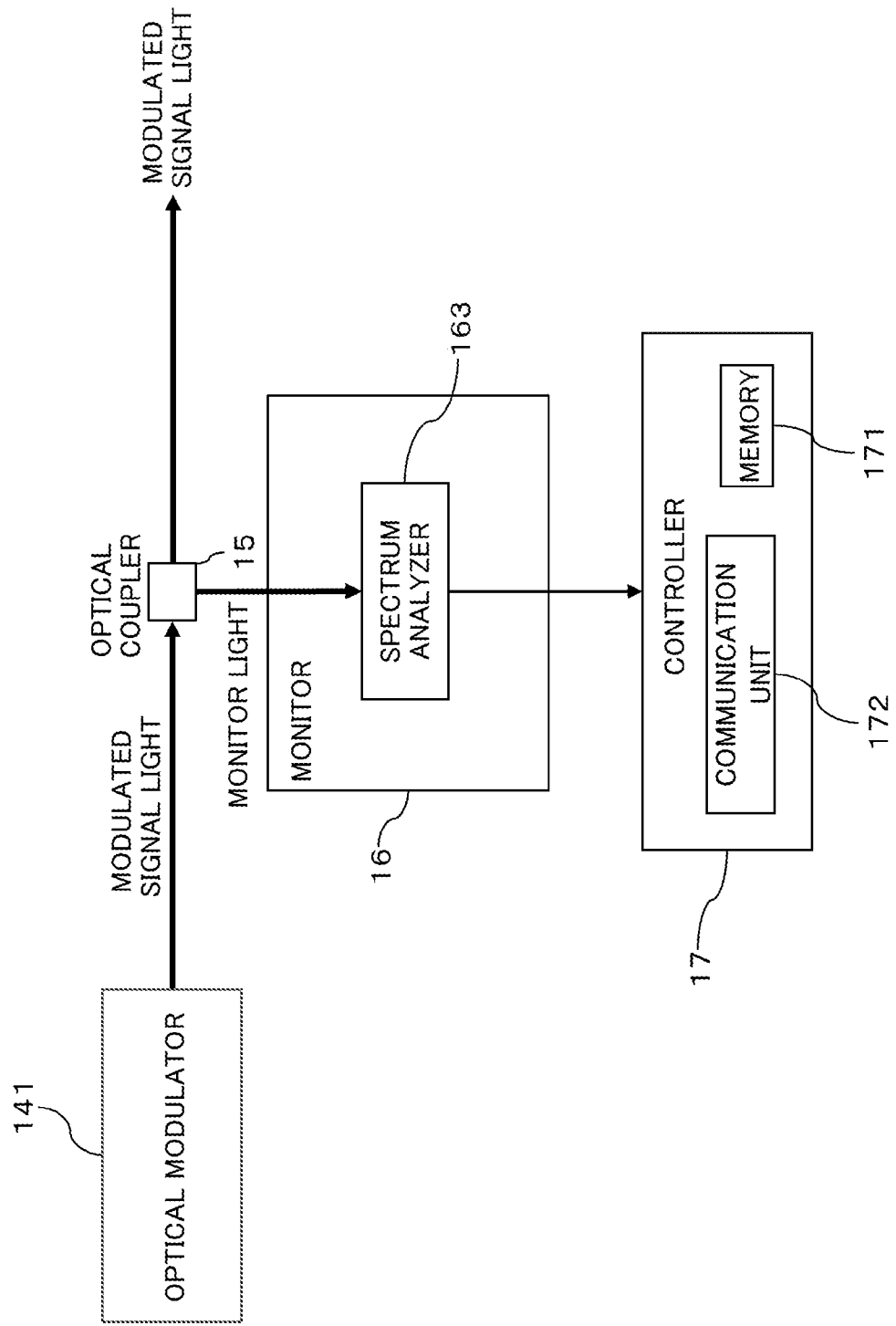
FIG. 9 is a block diagram illustrating a modified example of FIG. 8.

A measurement function of the monitor 16 may be achieved by using an optical spectrum analyzer 163 as illustrated in FIG. 9. However, since the optical spectrum analyzer 163 would be costly, the exemplary configuration illustrated in FIG. 8 is advantageous in that the monitor 16 can be achieved by a simple configuration and at low cost.

Next, an exemplary operation of the controller 17 will be described with reference to FIG. 10.

Figure 10:
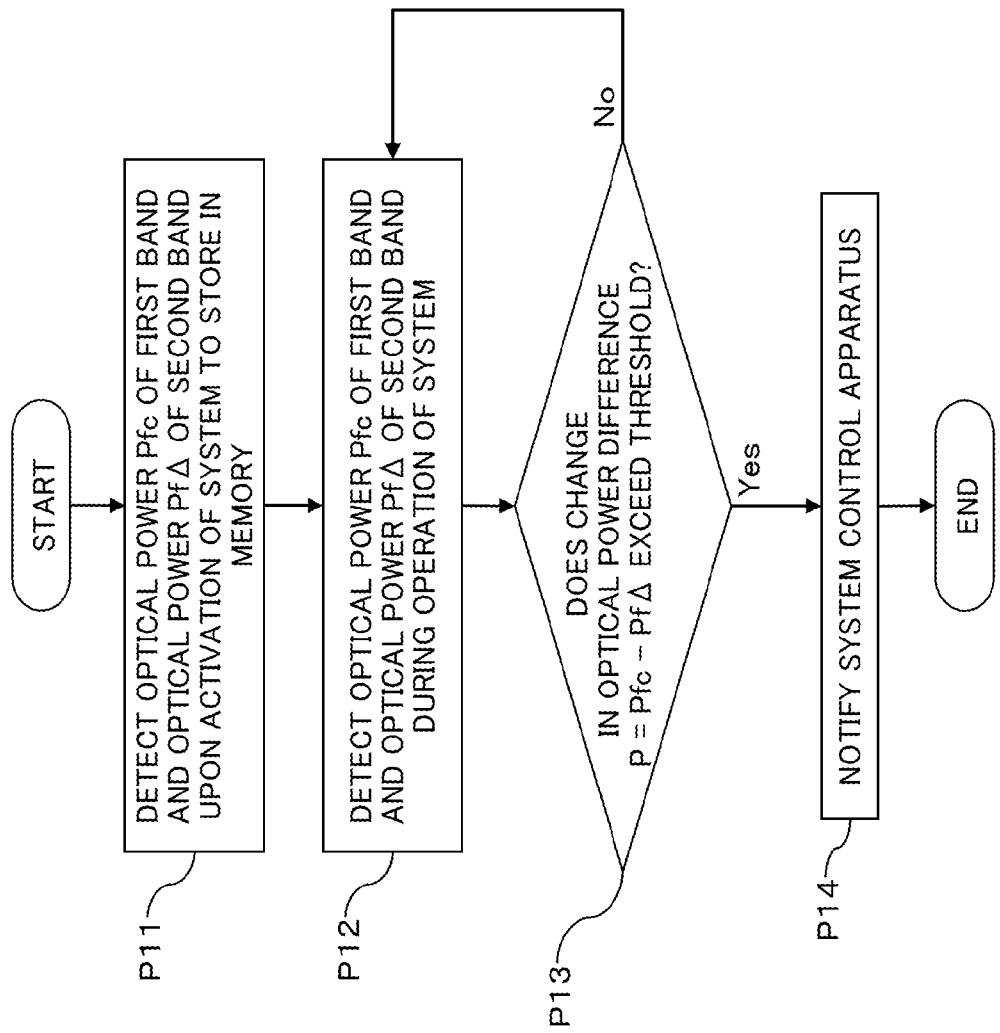
FIG. 10 is a flowchart illustrating operations of the monitor and a controller illustrated in FIG. 1.

As illustrated in FIG. 10, when the optical transmission system is activated and then the optical transmitter 1 is activated, the monitor 16 measures the optical power Pfc of the first band including the center frequency fc of modulated signal light, and the optical power PfΔ of the second band shifted from the center frequency fc by substantially +B/2. The measurement results are output to the controller 17. The measurement results at the activation of the system may be considered as initial measurement results. The controller 17 stores the received measurement results in, for example, the memory 171 (processing P11).

Subsequently, for example, during operations of the system, the controller 17 obtains measurement results of the optical power Pfc and PfΔ from the monitor 16 again, and detects a change in the optical power difference P based on the measurement results and the initial measurement results stored in the memory 171 (processing P12).

Further, the controller 17 compares the detected change amount of the optical power difference P with the threshold value stored in the memory 171 to check whether or not the change amount of the optical power difference P exceeds the threshold value (in other words, whether or not the change amount exceeds a predetermined deterioration amount) (processing P13).

In response to a detection that the change amount of the optical power difference P exceeds the predetermined deterioration amount (Yes in the processing P13), the controller 17 enables, for example, the communication unit 172 to notify the system control apparatus 2 of an occurrence of deterioration in quality of the modulated signal light transmitted by the optical transmitter 1 (processing P14).

Meanwhile, when the change amount of the optical power difference P does not exceed the predetermined deterioration amount (No in the processing P13), the controller 17 returns to the processing P12, and continues monitoring the change in the optical power difference P during operations of the system.

As described above, according to the above embodiment, it is possible to detect the band change (or band deterioration) occurred in the modulated signal due to a change in characteristics of the drive signal applied to the optical modulator 141. Further, since the detected band change is notified to the system control apparatus 2, it is possible to perform control or adjustment to compensate for a deterioration in signal quality in the entire optical transmission system. Accordingly, it is possible to improve transmission quality of the entire optical transmission system.

Information (which may also be referred to as "band change information") indicative of the detected band change may be notified (or fed back) to the DSP 111 as indicated by a dotted line arrow in FIG. 1, for example. The DSP 111 may include a band compensation processing of the drive signal (or electrical signal) as an example of the digital signal processing, and may control the band compensation processing to compensate for (e.g. minimize) the band change detected by the monitor 16 based on the band change information notified from the controller 17. In other words, the controller 17 may control the digital signal processing performed by the DSP 111 to compensate for the band change detected by the monitor 16.

(Second Exemplary Method of Detecting Change in Band Characteristics)

Figure 11:
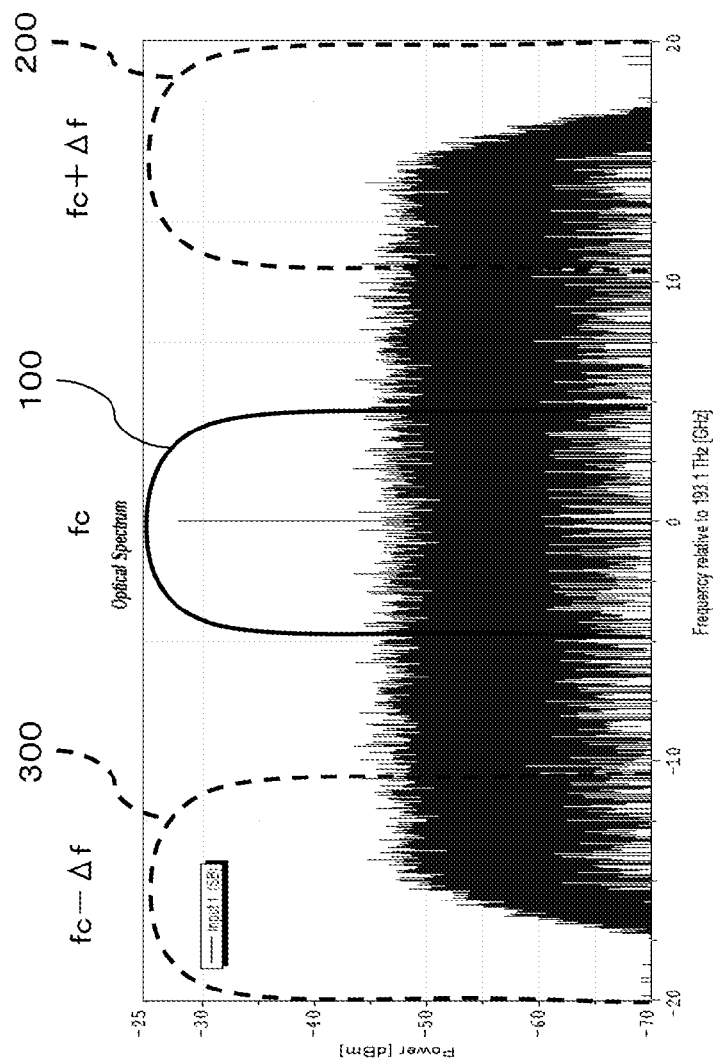
FIG. 11 is a diagram illustrating an exemplary spectrum of Nyquist QPSK modulated signal light to explain a modified example of a monitor band of the spectrum.

In the above example, the two monitor bands (in other words, the filter characteristics 100 and 200) are set to the spectrum of modulated signal light. However, three monitor bands (or filter characteristics 100 to 300) may be set as illustrated in FIG. 11, for example. An exemplary configuration of the monitor 16 in the second example may be the same as the configuration illustrated in FIG. 8 or 9.

The first band corresponding to the filter characteristics 100 and the second band corresponding to the filter characteristics 200 may be the same as the bands described already with reference to FIG. 3. The third band corresponding to the filter characteristics 300 may be set to a symmetrical band with respect to the second band around the first band. The first to third bands corresponding to the filter characteristics 100 to 300 may also be referred to as the first to third monitor bands 100 to 300, respectively, for descriptive purpose.

For example, the third monitor band 300 may correspond to a band including a center frequency of a frequency (fc−fΔ) shifted from the center frequency fc of modulated signal light by substantially half (B/2) of a baud rate in a negative frequency. Further, the bandwidth of the third monitor band 300 may also be about B/2.

The monitor 16 may set the filter characteristics 100 to 300 corresponding to the three monitor bands by changing one of the transmission center frequency of the tunable optical filter 161, or the filter characteristics 100 to 300 maybe realized by using individual optical filters.

In this example, the optical power meter 162 measures optical power Pfc, P(+fΔ) and P(−fΔ) of the three monitor bands 100 to 300. Pfc is the optical power of the first monitor band 100 including the center frequency fc of the modulated signal light. Pf(+fΔ) is the optical power of the second monitor band 200 shifted from the center frequency fc by substantially +B/2. Here, P(−fΔ) is the optical power of the third monitor band 300 shifted from the center frequency fc by substantially −B/2.

The controller 17 detects optical power difference P=Pfc−(P(+fΔ)+P(−fΔ)), and detects the change in the optical power difference P. In this way, by detecting the optical power of the three monitor bands 100 to 300, the change amount of the optical power difference P in response to the band change becomes large compared to a power detection of the two monitor bands 100 and 200 as illustrated in FIG. 3. Accordingly, it is possible to improve detection sensitivity of the optical power difference P.

(Third Exemplary Method of Detecting Change in Band Characteristics 3)

According to the methods illustrated in FIGS. 3 and 11, the two or three different monitor bands are set to the spectrum of modulated signal light. However, two different monitor bands 100 and 400 having different bandwidths and including the same monitor band may be set as illustrated in FIG. 12, for example.

Figure 12:
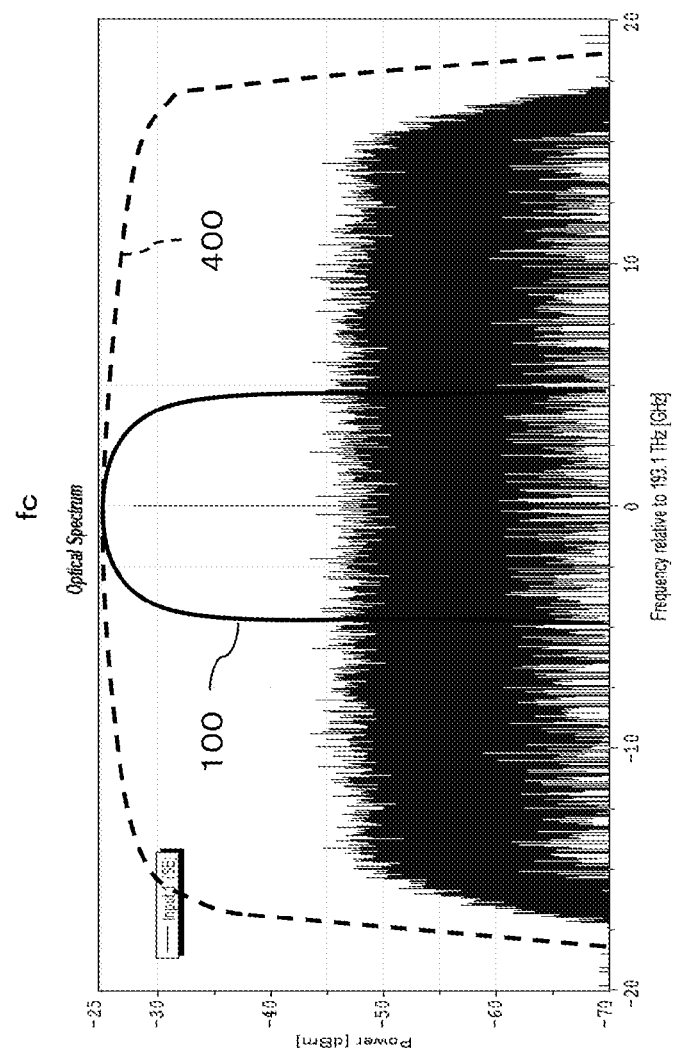
FIG. 12 is a diagram illustrating an exemplary spectrum of Nyquist QPSK modulated signal light to explain another modified example of the monitor band of the spectrum.

In FIG. 12, the first monitor band 100 may be the same as the band 100 illustrated in FIGS. 3 and 7. For example, the first monitor band 100 may have the center frequency fc and the bandwidth corresponding to substantially half of a baud rate (B/2). Meanwhile, the second monitor band 400 may have the center frequency fc and the bandwidth which includes a whole band of the spectrum of modulated signal light. A non-restrictive example of the bandwidth of the second monitor band 400 may be a bandwidth corresponding to 1.2 times (1.2×B) of the baud rate.

Filter characteristics corresponding to the two monitor bands 100 and 400 may be set by changing a transmission bandwidth of a single variable band wavelength optical filter which has the transmission center frequency fc and variable transmission bandwidth. Alternatively, the filter characteristics corresponding to the two monitor band 100 and 400 may be achieved by using individual optical filters.

Figure 13:
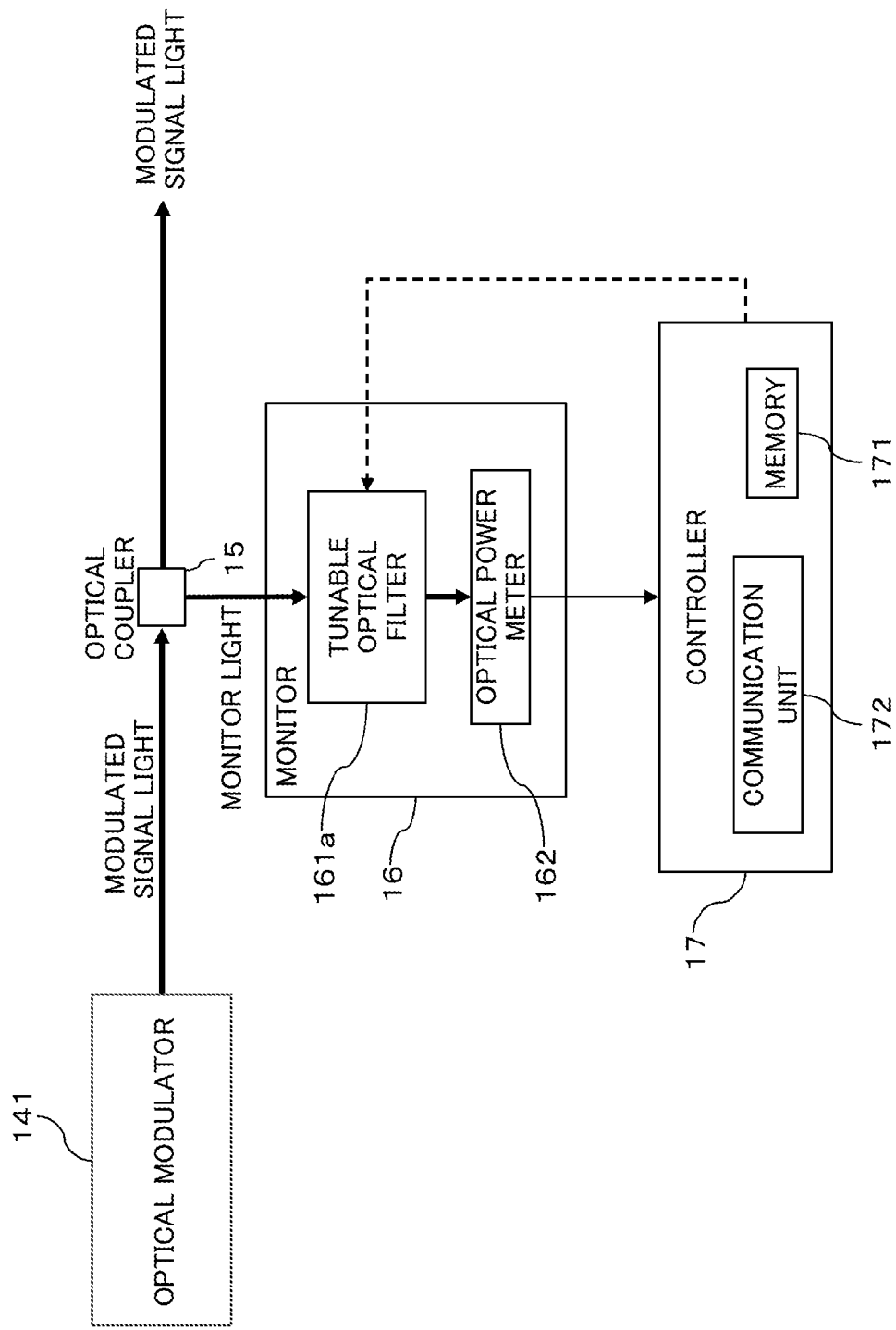
FIG. 13 is a block diagram illustrating another modified example of FIG. 8.

FIG. 13 illustrates an exemplary configuration of the monitor 16 provided with a variable band wavelength optical filter 161a. The variable band wavelength optical filter 161a may have not only a variable transmission bandwidth but also a variable transmission center wavelength. One or both of the transmission bandwidth and the transmission center wavelength of the variable band wavelength optical filter 161a may be controlled (or set) by the controller 17.

The optical power meter 162 of the monitor 16 illustrated in FIG. 13 measures optical power Pfc and Pfall of the two monitor bands 100 and 400.

The controller 17 detects optical power difference P=Pfc−Pfall and detects a change in the power difference P.

In this way, by setting the monitor bands 100 and 400 of different bandwidths including the same band 100, it is also possible to detect the change in the optical power difference P and the band change (or band deterioration) occurred in the modulated signal light due to the change in the characteristics of the drive signal applied to the optical modulator 141.

(Application to Polarization-Multiplexing Scheme)

Figure 14:
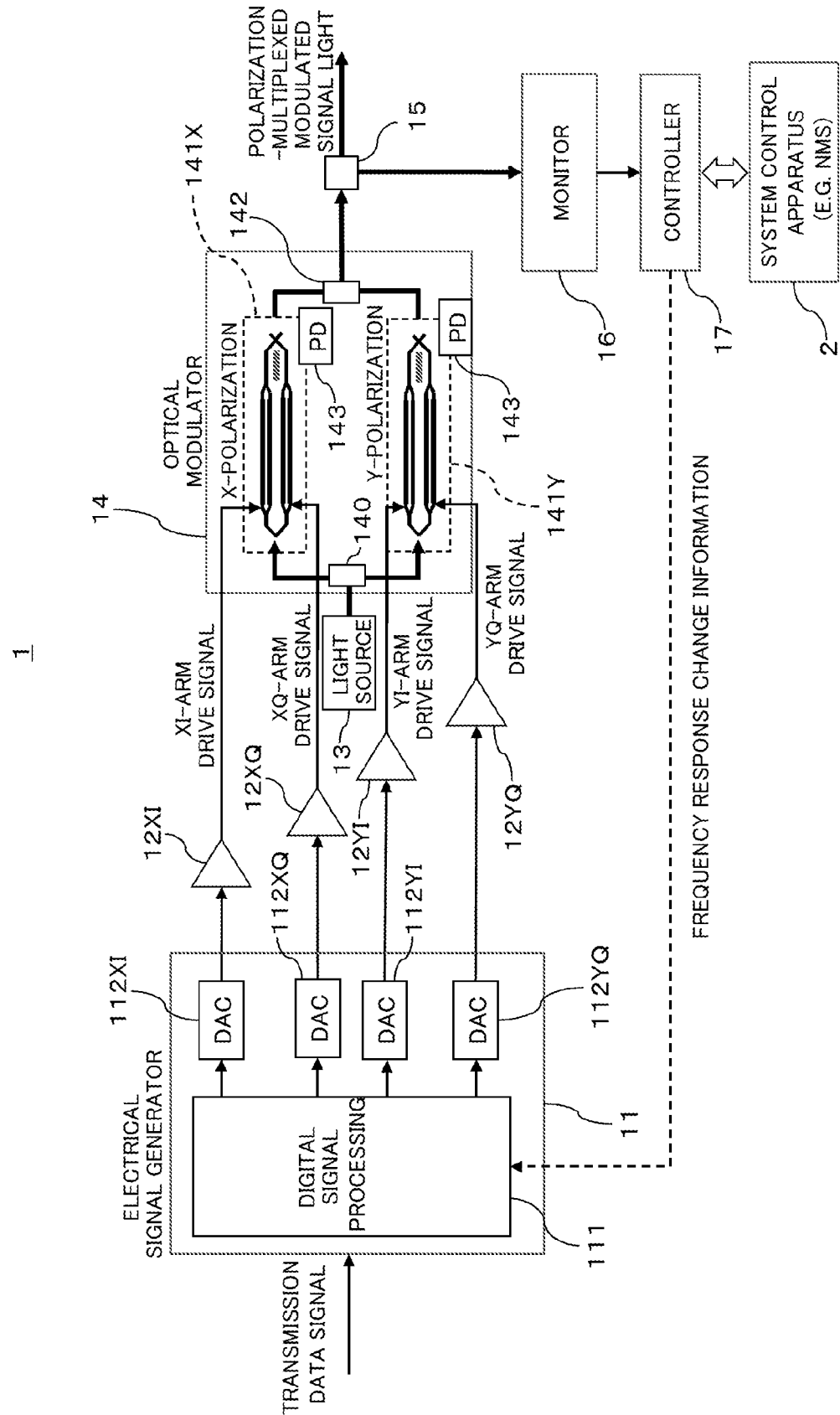
FIG. 14 is a block diagram illustrating an exemplary configuration of the optical transmitter to which a polarization-multiplexing scheme is applied according to one embodiment.

The aforementioned detection of the band change due to the change in characteristics of the drive signal is applicable to the optical transmitter 1 using a polarization-multiplexing scheme such as DP-QPSK or DP-QAM. FIG. 14 illustrates an exemplary configuration of the optical transmitter 1 using the polarization-multiplexing scheme.

The optical modulator 14 of the optical transmitter 1 illustrated in FIG. 14 may include, for example, a polarization beam splitter (PBS) 140, optical modulators 141X and 141Y respectively corresponding to different polarizations (e.g. an X-polarization and a Y-polarization), and a polarization beam combiner (PBC) 142.

The PBS 140 separates transmission light input from the light source 13 to X-polarization components and Y-polarization components. The separated X-polarization components are input to the optical modulator 141X and the separated Y-polarization components are input to the optical modulator 141Y.

Each of the optical modulators 141X and 141Y may have the same configuration as that of the optical transmitter 1 illustrated in FIG. 1. For example, each of the optical modulator 141X and 141Y may include an optical branch, an I-arm, a Q-arm and an optical interferer. The optical branch receives an input of light of the polarization components separated by the PBS 140. Optionally, one or both of the optical modulators 141X and 141Y may be provided with a PD 143 in a manner similar to the configuration of FIG. 1. In other words, individual power of different polarization components in modulated signal light is monitored by the PD 143.

The I-arm and the Q-arm of the optical modulator 141X corresponding to the X-polarization components may also be referred to as an "XI-arm" and an "XQ-arm", respectively, for descriptive purpose. Similarly, the I-arm and the Q-arm of the optical modulator 141Y corresponding to the Y-polarization components may also be referred to as a "YI-arm" and a "YQ-arm", respectively, for descriptive purpose.

Light of the X-polarization components separated by the PBS 140 propagates in the XI-arm and the XQ-arm. Light of the Y-polarization components separated by the PBS 140 propagates in the YI-arm and the YQ-arm.

Each of the XI-arm, the XQ-arm, the YI-arm and the YQ-arm may be provided with a drive electrode which is not illustrated. The respective drive electrodes are supplied drive signals by drivers 12XI, 12XQ, 12YI and 12YQ, respectively. Each of the drivers 12XI, 12XQ, 12YI and 12YQ may be an electrical amplifier similar to the drivers 12I and 12Q illustrated in FIG. 1.

The drivers 12XI, 12XQ, 12YI and 12YQ receive analog electrical modulated signals generated by the electrical signal generator 11 for the different X-polarization components and the Y-polarization components, and for in-phase (I) components and quadrature (Q) components.

The electrical signal generator 11 may include, for example, a DSP 111, and a DAC 112XI, a DAC 112XQ, a DAC 112YI and a DAC 112YQ corresponding to the different X-polarization and Y-polarization components and the in-phase (I) components and the quadrature (Q) components.

The DSP 111 performs a digital signal processing including a digital modulation processing such as the Nyquist QPSK and the 16QAM on a transmission data signal to generate digital electrical modulated signals of the X-polarization components and the Y-polarization components, and the I components and the Q components.

The generated digital electrical signal modulated signals are converted into analog electrical modulated signals by the DACs 112XI, 112XQ, 112YI and 112YQ corresponding to the above-described four arms, respectively. The analog electrical modulated signals are supplied to the corresponding drivers 12XI, 12XQ, 12YI and 12YQ.

Each of the drivers 12XI, 12XQ, 12YI and 12YQ amplify the input analog electrical modulated signal such that the individual analog electrical modulated signal has an appropriate amplitude as a drive signal supplied to the optical modulator 141X or the optical modulator 141Y.

By supplying the drive signals to the drive electrodes corresponding to the four arms of XI, XQ, YI and YQ, the refractive index of the corresponding arms change, and the phase of transmission light propagating in each arm changes. In response to the change in phase, the intensity of the light output from each optical interferer of each of the optical modulators 141X and 141Y changes.

In this way, the transmission light of the different X-polarization and Y-polarization components from the light source 13 is modulated by the optical modulators 141X and 141Y with the drive signals corresponding to transmission data signal to generate modulated signal light.

The modulated signal light of the X-polarization components output from the one optical modulator 141X and the modulated signal light of the Y-polarization components output from the other optical modulator 141Y are input to the PBC 142.

The PBC 142 may combines (may also be referred to "polarization-multiplexes") light of the X-polarization components and the Y-polarization components. The polarization-multiplexed light is output as polarization-multiplexed transmission light to an optical transmission line from the optical transmitter 1. Part of the polarization-multiplexed signal light is tapped to the monitor 16 by the optical coupler 15.

The monitor 16 may have the same configuration as the configuration illustrated in FIG. 8, 9 or 13. In other words, the monitor 16 and the controller 17 illustrated in FIG. 14 is possible to detect a band change in the spectrum of the polarization-multiplexed signal light output from the optical modulator 14 by using the detection method described with reference to FIG. 3, 11 or 12.

The controller 17 may notify (or feedback) band change information to the DSP 111 as indicated by a dotted line arrow in FIG. 14 similar to FIG. 1. The DSP 111 may control the band compensation processing on the drive signals of the electrical signals based on the notified band change information. Further, when the controller 17 detects that the band change of the polarization-multiplexed transmission light exceeds the threshold value and deteriorated, the communication unit 172 may notify the system control apparatus 2 of an occurrence of determination in quality due to the band deterioration of the polarization-multiplexed transmission light transmitted by the optical transmitter 1.

First Modified Example

There is a case where a monitor signal or a control signal (hereinafter, may collectively be referred to as a "control signal") is superimposed on modulated signal light (which may also be polarization-multiplexed transmission light) output from the optical modulator 14.

For example, the control signal having a low frequency which is sufficiently lower than the frequency of the modulated signal light may be superimposed on the modulated signal light. The low frequency signal may be, for example, at orders of mega hertz while the frequency of modulated signal light is at orders of giga bits.

Figure 15:
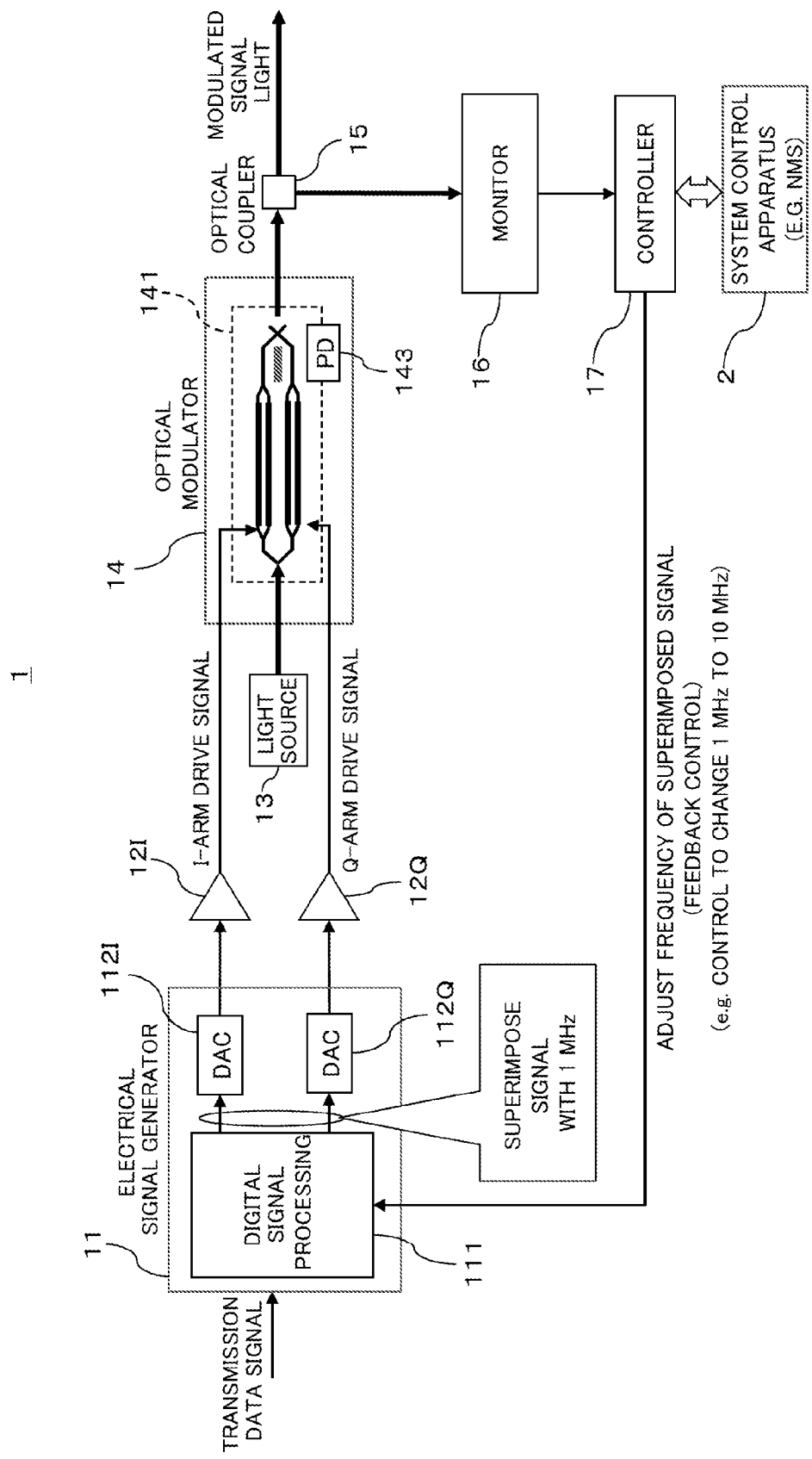
FIG. 15 is a block diagram illustrating a modified example of the optical transmitter illustrated in FIG. 1 to explain an example where the frequency of a control signal is controlled to a frequency not impacting to the monitor when an electrical signal generator superimposes the control signal on a digital electrical modulated signal.

The low frequency signal which is an example of the control signal may be generated by performing a digital signal processing on a transmission data signal by a DSP 111 of an electrical signal generator 11 as illustrated in FIG. 15, for example. In other words, the low frequency signal (e.g., with 1 MHz in FIG. 15) is superimposed on the drive signal applied to the optical modulator 14. Consequently, the low frequency signal subjected to an amplitude modulation is superimposed on the modulated signal light.

When the low frequency signal is superimposed on modulated signal light in this way, an optical spectrum of the modulated signal light cyclically fluctuates, and therefore, optical power monitored by the monitor 16 also cyclically fluctuates. Hence, when a fluctuation cycle matches with a monitor cycle of the monitor 16, detection accuracy of the band change may deteriorates.

In order to prevent such deterioration of the detection accuracy, for example, the monitor 16 (for example, the optical power meter 162 and the spectrum analyzer 163) or a controller 17 may average the optical power of monitor light for a longer period of time than the fluctuation cycle.

Alternatively, as illustrated in FIG. 15, the controller 17 may perform feedback control such that the DSP 111 changes the low frequency signal (1 MHz) to be superimposed to another frequency (for example, 10 MHz) which does not impact on monitoring of the monitor 16.

When the post-changed frequency signal is still available as a control signal which can achieve the original control purpose, the detection of the band change by using the monitor 16 and the controller 17 is compatible with a control using the control signal.

Second Modified Example

The number of target monitor bands (hereinafter, may also be referred to as "monitor points" for descriptive purpose) of the monitor 16 may be fixed or variable. For example, there is a case where a DSP 111 of the electrical signal generator 11 changes a modulation format to be applied to a transmission data signal during operations of the system. In response to the change of the modulation format, the number of monitor points may also be changed.

For example, in response to a change of the modulation format, the change amount of optical power difference P measured by the monitor 16 may also be changed. In other words, there is a case where monitoring sensitivity of the monitor 16 fluctuates according to the modulation format of the digital signal processing in the DSP 111.

Figure 16:
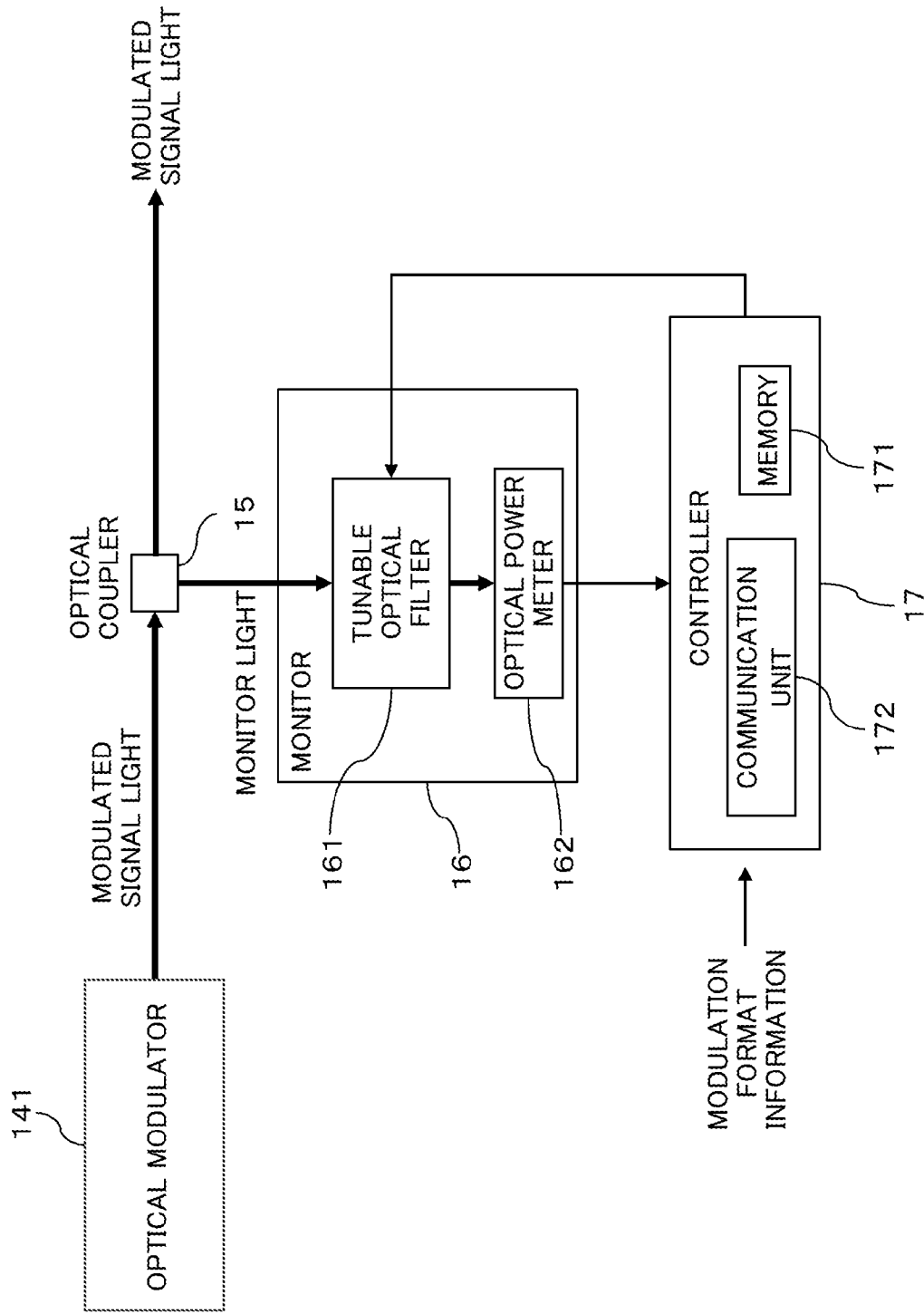
FIG. 16 is a block diagram illustrating the modified example of FIG. 8 to explain an exemplary configuration in a case where the number of monitor bands is variable.

Hence, as illustrated in FIG. 16, the controller 17 may adaptively control filter characteristic of the tunable optical filter 161 provided in the monitor according to the change in the modulation format. Accordingly, it is possible to set the number of monitor points suitable for the modulation format.

The number of monitor points with respect to a modulation format may be set (or stored) in a memory 171 of the controller 17 in advance. Information available to identify the modulation format (hereinafter, may also be referred to as "modulation format information") may be given to the controller 17 from an external apparatus such as the system control apparatus 2. The modulation format information may be stored in the memory 171 of the controller 17.

An exemplary operation of the controller 17 including controlling the number of monitor points according to a modulation format will be described with reference to a flowchart illustrated in FIG. 17.

Figure 17:
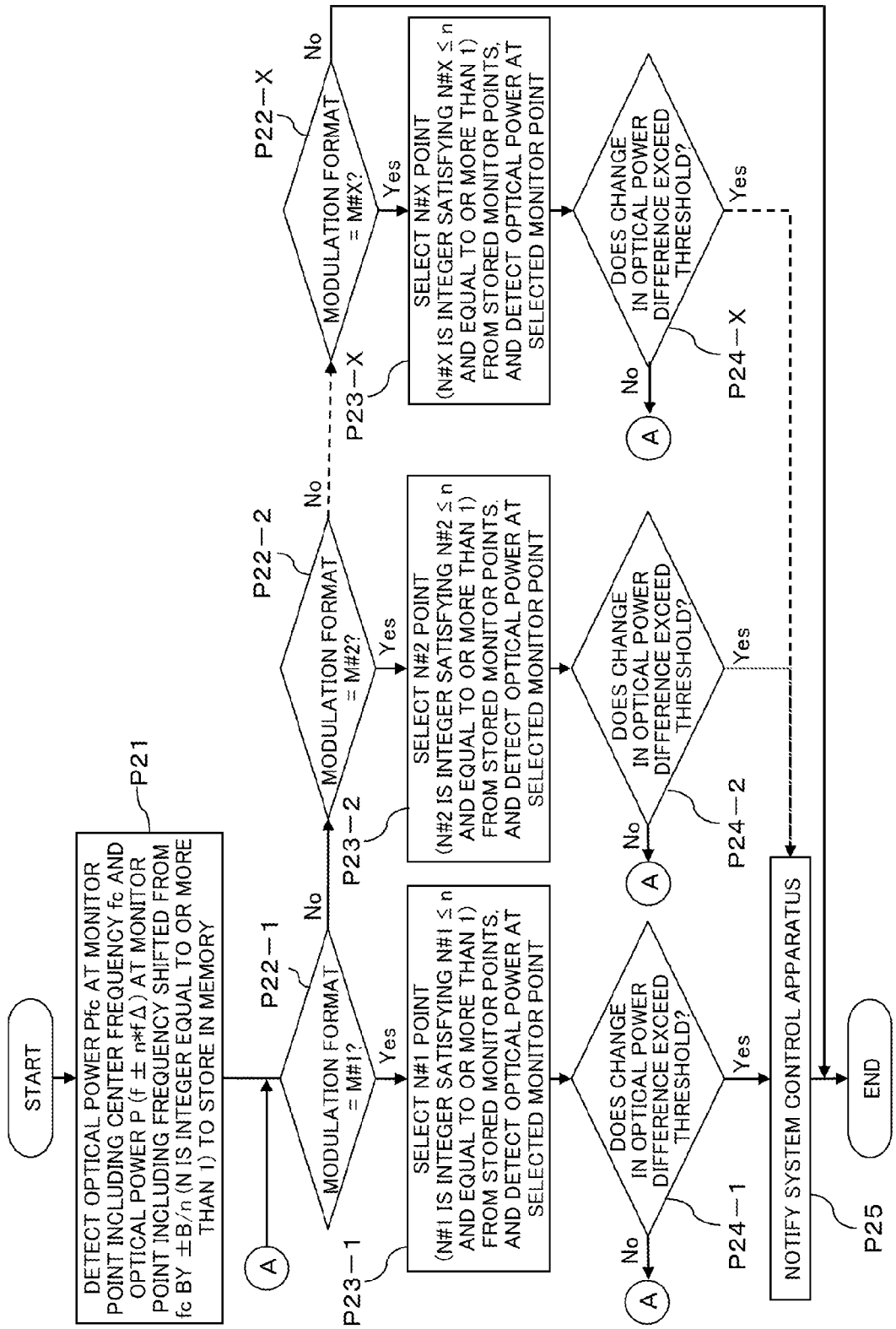
FIG. 17 is a flowchart illustrating operation examples of the monitor and the controller illustrated in FIG. 16.

As illustrated in FIG. 17, the controller 17 may perform pre-processing indicated by processing P21 when the optical transmitter 1 is activated in response to an activation of the optical transmission system, for example. For example, in pre-processing P21, the controller 17 sets filter characteristics of the tunable optical filter 161 such that light at monitor point including the center frequency fc of modulated signal light is input to an optical power meter 162.

The optical power meter 162 detects (or measures) optical power Pfc of light passed through the tunable optical filter 161 at the monitor point including the center frequency fc. The controller 17 stores information of the optical power Pfc detected by the optical power meter 162 in the memory 171.

Further, in pre-processing P21, the controller 17 sets the filter characteristics of the tunable optical filter 161 such that the light of the monitor point including a frequency shifted from the center frequency fc of the modulated signal light by substantially $\pm B/n$ (n is an integer equal to or more than 1) is input to the optical power meter 162. The controller 17 changes the filter characteristics of the tunable optical filter 161 for a plurality of monitor points by changing the value of "n".

The optical power meter 162 detects (or measures) the optical power $P(f\pm n*f\Delta)$ at a corresponding monitor point per value of "n". The controller 17 stores information of the optical power $P(f\pm n*f\Delta)$ detected by the optical power meter 162 in the memory 171, for example.

According to the above pre-processing P21, information of the optical power Pfc and $P(f\pm n*f\Delta)$ which serve as references for each monitor point is stored in the memory 171. The optical power which serves as the reference for a monitor point may also be referred to as "reference optical power" for descriptive purpose.

After the pre-processing P21, the controller 17 identifies a current modulation format of a digital signal processing performed by the DSP 111 among from modulation formats M#i (i=1 to X and X is an integer equal to or more than 2) based on the modulation format information (processing P22-1 to 22-X).

In response to an identification of the current modulation format, the controller 17 selects monitor points corresponding to the number of monitor points N#i (an integer satisfying≤n) for the identified modulation format among from a plurality of monitor points stored in the memory 171 in pre-processing P21. Further, the controller 17 controls the filter characteristics of the tunable optical filter 161 such that light of the selected monitor points (hereinafter, may also be referred to the "selected monitor points") is input to the optical power meter 162.

Thereby, the optical power meter 162 detects (or measures) the optical power of the selected monitor points, and a detection results are given to the controller 17 (to processing P23-*i* from Yes route of processing P22-*i*).

The controller 17 detects an optical power difference between optical power of the selected monitor points and the reference optical power of the selected monitor points stored in the memory 171 in pre-processing P21, and checks whether or not the change in the optical power difference exceeds a threshold value (processing P24-*i*). The threshold value may be set (or stored) in the memory 171 in advance for each modulation format.

When a change in the optical power difference exceeds the threshold value (Yes in processing P24-$i$), the communication unit 172 of the controller 17 notifies the system control apparatus 2 of an occurrence of the band change (or band deterioration) in the modulated signal light, for example (processing P25). When the change in the optical power difference does not exceed the threshold value (No in processing P24-$i$), the controller 17 performs processing of identifying (which may also be referred to as "monitor") the modulation format depicted by processing P22-$i$.

When the identification of the modulation format is not available in processing P22-$i$ (No in processing P22-1 to P22-X), the controller 17 may finish monitoring the band change in the modulated signal light by using the monitor 16.

As described above, according to the modified examples illustrated in FIGS. 16 and 17, it is possible to change the number of monitor points according to a difference in the modulation format. Accordingly, it is possible to detect the band change of the modulated signal light with an appropriate monitoring sensitivity corresponding to the modulation format, even though the modulation format is changed during operations of the system, for example.

When the detected band change exceeds a predetermined deterioration amount, the communication unit 172 of the controller 17 notifies the system control apparatus 2 of an event that the detected band change exceeds the predetermined deterioration amount. Therefore, the system control apparatus 2 is possible to perform control or adjustment to compensate for a deterioration in signal quality in the entire optical transmission system. Accordingly, it is possible to improve transmission quality in the entire optical transmission system.

(Other)

Figure 18:
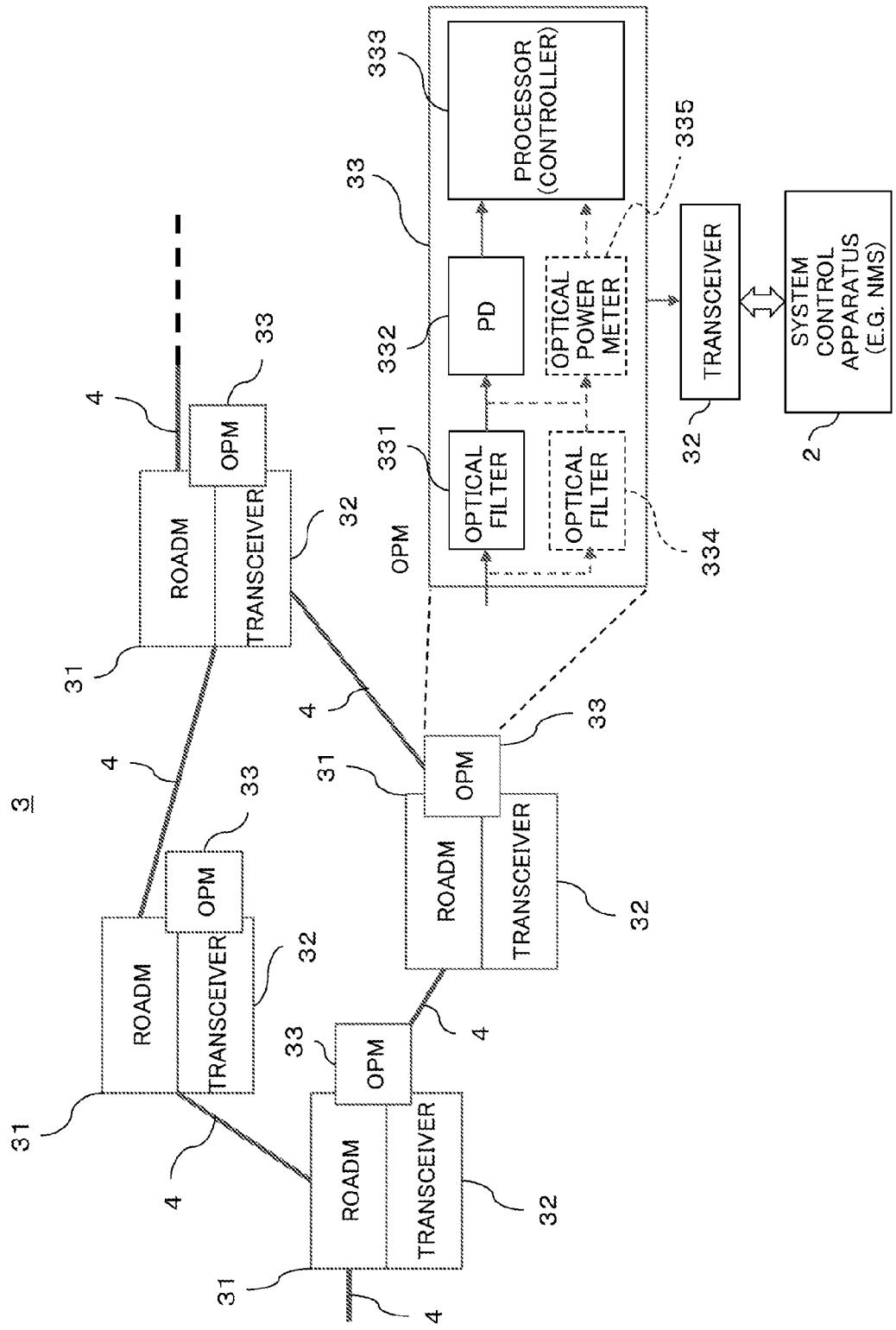
FIG. 18 is a block diagram illustrating an exemplary configuration of an optical transmission system according to a modified example.

FIG. 18 is a block diagram illustrating an exemplary configuration of an optical transmission system (which may also be referred to as an "optical network"). The optical transmission system 3 illustrated in FIG. 18 may include, for example, a plurality of ROADMs (Reconfigurable optical add-drop multiplexer) 31 The ROADMs 31 may be optically and communicably connected by optical transmission lines 4.

The optical transmission system 3 illustrated in FIG. 18 is a "mesh network" in which the ROADMs 31 are connected by the optical transmission lines 4 in a mesh topology. However, the optical transmission system 3 may be an optical network with other topologies such as a ring network. The ROADM 31 is an example of an optical transmission apparatus. The optical transmission apparatus may also be referred to as a "station" or a "node".

Each ROADM 31 may include, for example, a function of branching (or dropping) light in units of wavelength, an insertion (or add) function, and a through function.

The drop function makes it possible to drop to a transceiver 32 light with any one of wavelengths included in wavelength-division multiplexing (WDM) light received through the optical transmission line 4. The light dropped to the transceiver 32 may be referred to as a "drop light".

Further, the add function makes it possible to add light (which may also be referred to as "add light") with a wavelength transmitted from the transceiver 32 to the WDM light received through the optical transmission line 4.

Further, the through function makes it possible to transmit (or pass through) light of any one of the wavelengths included in the WDM light received through the optical transmission line 4 to an optical channel 4 corresponding to a different degree.

These drop function, the add function and the through function can be achieved by using an optical coupler or a wavelength selective switch (WSS).

The transceiver 32 may include a receiver which receives the drop light and a transmitter which transmits the add light. The transceiver 32 may also be referred to as a "transponder 32".

The receiver receives and demodulates the drop light, and remaps the resulting signal on a frame signal of a client network (which may also be referred to as a "tribute network").

The client network may be the Ethernet (registered trademark) or a synchronous digital network such as SDH or SONET. The WDM light transmitted through the optical transmission line 4 may be transmitted in an OTN (Optical Transport Network) frame.

Hence, the receiver may convert the OTN frame of the received drop light into a frame signal of the client network such as an Ethernet frame. The received drop light may be received by way of coherent reception. In other words, the receiver may be a coherent receiver.

Even though the drop light with a plurality of wavelengths is input to the coherent receiver, the coherent receiver is available to selectively receive the light with the wavelength corresponding to a wavelength of local light. The wavelength of local light corresponds to "a target reception wavelength" of the transponder 32, and the target reception wavelength can be controlled by using a tunable laser diode (LD) for a local light source.

Meanwhile, focusing upon the transmitter of the transponder 32, the transmitter may include a transmission light source which emits light of a wavelength (which may be referred to as an "add wavelength" or a "transmission wavelength") corresponding to add light, an optical modulator which modulates the light of the transmission wavelength with a transmission data signal.

The transmission data signal may be generated by a digital signal processing circuit. The digital signal processing circuit may perform a digital modulation processing and a digital waveform shaping processing on a transmission data signal. By performing the digital modulation processing, it is possible to superimpose an auxiliary data signal (which may be referred to as an "auxiliary signal") on the transmission data.

For example, by performing an FSK (Frequency Shift Keying) on the transmission data signal (which may be referred to as a main signal), it is possible to superimpose FSK signal components serving as the auxiliary signal on the main signal. The auxiliary signal may be a monitor control signal or some kind of a measurement signal. The auxiliary signal may also be referred to as an "auxiliary channel".

The digital waveform shaping processing may include a Nyquist filtering. By applying the waveform shaping processing to the transmission data signal using the Nyquist filtering, it is possible to narrow the spectrum of transmission modulated signal light obtained by the optical modulator. Since the spectrum can be narrowed, it is also possible to support multicarrier transmission such as a "super channel" transmission.

By the way, the ROADM 31 may be provided with an optical performance monitor (OPM) 33 which monitors power of WDM light received from the optical transmission line 4, WDM light transmitted to the optical transmission line 4, the drop light, the add light, and the through light, as illustrated in FIG. 18.

The OPM 33 may include, for example, an optical filter 331, a PD (photo detector or photo diode) 332 and a processor (which may be referred to as a "controller") 333.

The optical filter 331 may be an optical band pass filter, and allows light of a monitoring target band of input light to pass to the PD 332, for example. The optical filter 331 may be a tunable optical filter. The tunable optical filter is available to monitor light of an arbitrary wavelength included in the WDM light by changing a transmission wavelength.

The PD 332 receives light passed through the optical filter 331, and outputs an electrical signal (e.g. current signal) corresponding to optical power of the received light. The current signal corresponding to the received optical power at the PD 332 may be converted into a voltage signal by a transimpedance amplifier (TIA), for example.

When the above-described FSK signal components are superimposed as an auxiliary signal on the light input to the optical filter 331, the FSK signal components are converted into the amplitude modulated signal by filtering in the optical filter 331. Accordingly, an electrical signal having amplitude components corresponding to the amplitude modulated signal appears in the output of the PD 332, and this electrical signal is detected as the auxiliary signal.

The processor 333 performs a monitor processing of checking whether or not signal light satisfies, for example, a power level or an OSNR (Optical to Signal Noise Ratio) based on the electrical signal corresponding to the received optical power input from the PD 332. In response to a detection of the auxiliary signal by the PD 332, the processor 333 may perform a processing (which may include a monitor control and a measurement) according to the detected auxiliary signal.

The OPM 33 including the optical filter 331 and the PD 332 may be provided in the node 31. The optical filter 331 of the OPM 33 can be shared by the optical filter 161 or the optical filter 161a for the above-described monitor 16. In other words, it is possible to realize the above-described monitor 16 by using the optical filter 331 of the OPM 33 existing in the node 31.

For example, when the optical filter 331 is the tunable optical filter, the optical filter 331 can be used for the tunable optical filter 161 illustrated in FIG. 8. When the optical filter 331 is the variable band wavelength optical filter, the optical filter 331 can be used for the variable band wavelength optical filter 161a illustrated in FIG. 13.

Therefore, the processor 333 of the OPM 33 is possible to detect the band change of modulated signal light in a manner similar to the above-described example by performing the above-described processing of the controller 17. In other words, the processor 333 may be considered to correspond to the controller 17.

In addition, when the optical filter 331 provided in the OPM 33 is an optical filter with a fixed passband, the optical filter 331 is only necessary to be replaced with the tunable optical filter 161 or the variable band wavelength optical filter 161a.

Alternatively, an optical filter 334 corresponding to the tunable optical filter 161 or the variable band wavelength optical filter 161a may be added to the OPM 33 in addition to the optical filter 331. Further, instead of the PD 332 (or in addition to the PD 332), an optical power meter 335 may be provided in the OPM 33. The optical power meter 335 may be considered to correspond to the above-described optical power meter 162.

In this way, since the above-described monitor 16 can be achieved by using the existing OPM 33 provided in the node 31, it is possible to detect the band change of the main signal light without additional optical components for the monitor 16 or with the minimum additional optical components. Accordingly, it is possible to implement a function of the monitor 16 on the node 31 at low cost.

According to the above technique, it is possible to prevent deterioration in optical signal quality due to the change in characteristics of the drive signal applied to the optical modulator.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiment(s) of the present invention have been described in detail, it should be understood that the various changes, substitutions, and alterations could be made hereto without departing from the spirit and scope of the invention.

What is claimed is:

1. An optical transmission apparatus comprising:
   a digital signal processor configured to perform a digital signal processing on a data signal to generate an electrical signal;
   an optical modulator that is driven by a drive signal, the drive signal being generated from the electrical signal generated by the digital signal processor;
   a detector configured to detect a frequency response change in a spectrum of output light of the optical modulator, the frequency response change depending on a frequency response change of the drive signal; and
   a controller configured to control the digital signal processing in the digital signal processor based on a detection result of the detector.

2. The optical transmission apparatus according to claim 1, wherein
   the digital signal processing includes a characteristic compensation processing of the electrical signal, and
   the controller controls the characteristic compensation processing to compensate for the frequency response change in the spectrum detected by the detector.

3. The optical transmission apparatus according to claim 1, wherein
   the digital signal processing includes a processing of superimposing a frequency signal on the drive signal, and
   the controller changes a frequency of the frequency signal to be superimposed on the drive signal, according to the detection result of the detector.

4. The optical transmission apparatus according to claim 1, wherein the optical modulator is driven by the drive signal having an amplitude smaller than an amplitude corresponding to a double half-wavelength voltage according to the digital signal processing.

5. The optical transmission apparatus according to claim 1, wherein the detector detects a change in a difference between optical power of a first band and optical power of a second band, the first band corresponding to a partial band of the spectrum including a center frequency of the spectrum of the output light, and the second band corresponding to a partial band of the spectrum different from the first band.

6. The optical transmission apparatus according to claim 5, wherein the second band corresponds to a band including a frequency shifted from the center frequency of the first band by a frequency corresponding to half of a baud rate.

7. The optical transmission apparatus according to claim 5, wherein the second band includes
a band including a frequency shifted from the center frequency of the first band by a positive frequency corresponding to half of a baud rate, and
a band including a frequency shifted from the center frequency by a negative frequency corresponding to the half of the baud rate.

8. The optical transmission apparatus according to claim 5, wherein the detector includes
a tunable optical filter configured to control a transmission center frequency to selectively transmit light of the first band and light of the second band, and
an optical power meter configured to measure transmitted optical power of the tunable optical filter.

9. The optical transmission apparatus according to claim 1, wherein the detector detects a change in a difference between optical power of a partial band of the spectrum and optical power of a whole band of the spectrum, the partial band including a center frequency of the spectrum of the output light of the optical modulator.

10. The optical transmission apparatus according to claim 1, wherein the detector comprises a spectrum analyzer configured to measure the spectrum of the output light of the optical modulator.

11. The optical transmission apparatus according to claim 1, wherein
the optical modulator is able to change a modulation format according to the digital signal processing, and
the controller variably controls the number of target points for detecting the frequency response change in the spectrum of the output light of the optical modulator according to the modulation format.

12. An optical transmission apparatus comprising:
a digital signal processor configured to perform a digital signal processing on a data signal to generate an electrical signal;
an optical modulator that is driven by a drive signal, the drive signal being generated from the electrical signal generated by the digital signal processor;
a detector configured to detect a frequency response change in a spectrum of output light of the optical modulator, the frequency response change depending on a frequency response change of the drive signal; and
a controller configured to notify an external apparatus of information indicative of an occurrence of a frequency response characteristics change in the output light of the optical modulator in response to a detection that the change in the spectrum detected by the detector exceeds a predetermined change amount.

13. The optical transmission apparatus according to claim 12, wherein the optical modulator is driven by the drive signal having an amplitude smaller than an amplitude corresponding to a double half-wavelength voltage according to the digital signal processing.

14. The optical transmission apparatus according to claim 12, wherein the detector detects a change in a difference between optical power of a first band and optical power of a second band, the first band corresponding to a partial band of the spectrum including a center frequency of the spectrum of the output light, and the second band corresponding to a partial band of the spectrum different from the first band.

15. The optical transmission apparatus according to claim 14, wherein the second band corresponds to a band including a frequency shifted from the center frequency of the first band by a frequency corresponding to half of a baud rate.

16. The optical transmission apparatus according to claim 14, wherein the second band includes
a band including a frequency shifted from the center frequency of the first band by a positive frequency corresponding to half of a baud rate, and
a band including a frequency shifted from the center frequency by a negative frequency corresponding to the half of the baud rate.

17. A detection apparatus comprising:
a drive signal generator configured to perform a digital signal processing on a data signal to generate an electrical signal, and generate a drive signal for an optical modulator that is driven by the drive signal generated from the electrical signal obtained by performing the digital signal processing; and
a detector configured to detect a change in a difference between optical power of a first band and optical power of a second band, the first band corresponding to a partial band of the spectrum including a center frequency of the spectrum of the output light of the optical modulator, and the second band corresponding to a partial band of the spectrum different from the first band, the change depending on a frequency response change of the drive signal.

18. The detection apparatus according to claim 17, wherein the optical modulator is driven by the drive signal having an amplitude smaller than an amplitude corresponding to a double half-wavelength voltage according to the digital signal processing.

19. The detection apparatus according to claim 17, wherein the second band corresponds to a band including a frequency shifted from the center frequency of the first band by a frequency corresponding to half of a baud rate.

* * * * *